United States Patent [19]
Morisaki

[11] Patent Number: 5,901,967
[45] Date of Patent: May 11, 1999

[54] CHANGEABLE CHUCK SYSTEM

[75] Inventor: Eiichi Morisaki, Nagoya, Japan

[73] Assignee: Howa Machinery, Ltd., Aichi-ken, Japan

[21] Appl. No.: 08/928,923

[22] Filed: Sep. 12, 1997

[30] Foreign Application Priority Data

Sep. 16, 1996 [JP] Japan ..................................... 8-266674

[51] Int. Cl.⁶ .................................................. B23B 5/22
[52] U.S. Cl. ...................... 279/4.12; 279/4.01; 279/4.12; 279/125; 279/143
[58] Field of Search ................. 279/4.01, 4.12, 279/125, 143

[56] References Cited

U.S. PATENT DOCUMENTS

| | | | |
|---|---|---|---|
| 3,814,448 | 6/1974 | Buck | 279/4.12 |
| 4,537,410 | 8/1985 | Hiestand | 279/4.01 |
| 4,550,922 | 11/1985 | Hall et al. | 279/143 |
| 4,697,966 | 10/1987 | Baur | 279/4.01 |

FOREIGN PATENT DOCUMENTS

| | | |
|---|---|---|
| 0200796 A2 | 11/1986 | European Pat. Off. . |
| 59-5210 | 1/1984 | Japan . |
| 62-28324 | 7/1987 | Japan . |
| 62-193710 | 8/1987 | Japan . |
| 5-253713 | 10/1993 | Japan . |

*Primary Examiner*—Andrea L. Pitts
*Assistant Examiner*—Monica Smith
*Attorney, Agent, or Firm*—Ladas & Parry

[57] ABSTRACT

In a changeable chuck system which can grip and release a workpiece by means of a chuck C by itself, fluid shut-off valves 20a and 20b are provided on a fluid supply portion provided on the tip of a main spindle 2 of a machine tool. When the chuck C is mounted on the main spindle 2, the fluid shut-off valves 20a and 20b are automatically connected to fluid couplers 111a and 111b provided behind the chuck C, and a jaw operating cylinder 90 provided in the chuck C is actuated by a fluid supplied from a rear portion of the main spindle 2 to open and close gripping jaws 93. Thus, the gripping jaws 93 can be operated by means of the jaw operating cylinder 90 provided in the chuck C when the chuck C is mounted on the tip of the main spindle 2.

15 Claims, 14 Drawing Sheets

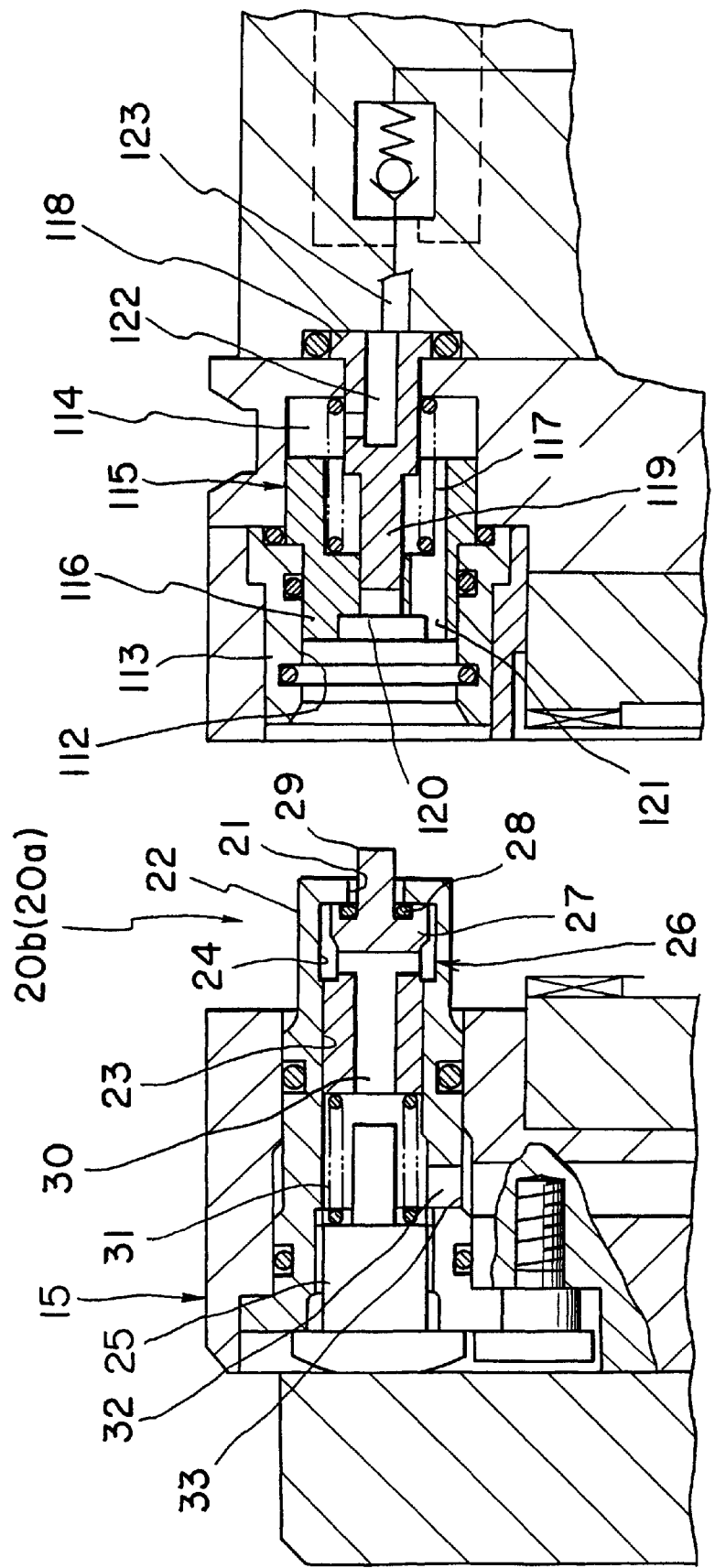

CHANGEABLE CHUCK SYSTEM

BACKGROUND OF THE INVENTION

1. Field of the Invention

The present invention relates generally to a changeable chuck system which is changeably mounted on a main spindle of a machine tool. More specifically, the invention relates to a changeable chuck system including a chuck, which can grip and release a workpiece by itself and which can be detached from a chuck mounting portion, such as the tip of a main spindle of a machine tool or a fixed workpiece-handling position other than the main spindle, to be transferred to another chuck mounting portion while gripping the workpiece.

2. Description of the Prior Art

A chuck system of this type is disclosed in Japanese Patent Appln. Laid-Open No. 5-253713 published on Oct. 5, 1993. In this system, a chuck is mounted on a chucking jig provided at a location other than the tip of a main spindle of a machine tool. When a fluid communication between a fluid connection port on the side of the chucking jig and a fluid supply/discharge port on the side of the chuck is established, pressurized fluid is supplied from the side of the chucking jig to a cylinder chamber of a chuck-jaw operating cylinder in the chuck via a check valve, so that the cylinder is actuated to open and close chuck jaws. The check valve prevents the fluid supplied to the cylinder chamber from being discharged to maintain the pressure of the supplied fluid so as to maintain the workpiece gripping state in which the workpiece is gripped by the chuck. While the workpiece gripping state is maintained, the chuck is detached from the chucking jig, and then, the chuck is mounted on the main spindle of the machine tool. Then, at the tip of the main spindle serving as a chuck mounting portion, a pull rod, which passes axially through the main spindle and which is linked to a rotating cylinder connected to the back end of the main spindle, is engaged with a piston rod which projects backwards from a piston of the chuck-jaw operating cylinder provided in the chuck. While the workpiece is mounted on the main spindle, if the workpiece gripping force is not sufficient with only the fluid pressure maintained by the check valve, the rotating cylinder forces the pull rod to draw the piston of the chuck-jaw operating cylinder to increase the gripping force for safety.

Another chuck system is disclosed in Japanese Utility Model Publication No. 62-28324 published on Jul. 21, 1987. In this system, pressurized fluid is supplied to the interior of a chuck from a supply port provided in the outer periphery of the chuck. By a check valve provided in the chuck and an air chamber (an accumulator chamber). the pressurized fluid is confined in a cylinder chamber provided in the chuck. In this state, the chuck is prepared on a workpiece mounting setup portion other than a main spindle of a machine tool, and an opening rod provided on the workpiece mounting setup portion pushes a release shaft projecting at the rear side of a piston of a cylinder in the chuck to move the piston to open chuck jaws. After a workpiece is introduced between the chuck jaws, the opening rod is moved backwards, and the workpiece is gripped by the chuck jaws, which are closed by the force of a spring for biasing the piston in a gripping direction and by the confined high-pressure fluid. The chuck thus gripping the workpiece is detachably mounted on the main spindle of the machine tool by means of a pull rod provided on the main spindle. After the machining is completed by means of the machine tool, the pull rod pushes the release shaft and the workpiece is removed from the main spindle. Thereafter, the pull rod is released and the chuck is detached from the main spindle.

Another chuck system is also disclosed in Japanese Utility Model Appln. Laid-Open No. 59-5210 published on Jan. 13, 1984. In this system, two arms are provided on a pivot which is pivotable and movable forwards and backwards in an axial direction. A chuck gripping mechanism is provided on each of the tips of the arms. A self-hold type chuck, such as a front chuck, is gripped by the chuck gripping mechanism to be moved to a mounting position of a main spindle, and then, the chuck is mounted on the main spindle by means of a connecting mechanism. In this mounted state, the machining is performed.

Still another chuck system is disclosed in Japanese Patent Appln. Laid-Open No. 62-193710 published on Aug. 25, 1987. In this system, chuck mounting means is provided on the front portion of a main spindle. A chuck is mounted on the main spindle by the chuck mounting means. In this mounted state, a jaw operating shaft is moved by means of a draw bar to open and close jaws.

In the case of the aforementioned chuck system disclosed in Japanese Patent Appln. Laid-Open No. 5-253713, irrespective of the fluid supplied to the jaw operating cylinder, when the chuck is mounted on the chuck mounting portion other than the main spindle, the jaw operating cylinder in the chuck is operated by the fluid to open and close the jaws. On the other hand, when the chuck is mounted on the main spindle, no pressurized fluid is supplied to the jaw operating cylinder in the chuck, and the gripping force of the jaws is increased (the jaws are further moved in the gripping direction) using the driving force of a separate rotating cylinder. Therefore, when the chuck is mounted on the main spindle, cylinders of two systems must be used to move the jaws in the gripping direction, so that there are cylinders that are not fully used. In addition, when the pressurized fluid operating the jaw operating cylinder in this chuck system is a pressure oil, if the pull rod draws the piston rod of the jaw operating cylinder on the main spindle to increase the gripping force, the pressure oil confined in the cylinder chamber of the jaw operating cylinder comes to have a negative pressure, so that the check valve preventing reverse flow of the pressure oil is opened to allow the fluid to leak. Therefore, when the drawing of the pull rod is released after the machining is completed on the main spindle mounting thereon the chuck, the pre-established pressure in the jaw operating cylinder becomes less than that before the piston rod is drawn by the pull rod, so that there occurs a problem in that the workpiece gripping force can not constantly be maintained. Moreover, in this system, when the pressure oil is charged while the chuck is mounted on the main spindle, even if it is tried to move the piston in the jaw releasing direction, the piston can not move since the pressure oil is incompressible. Therefore, there is a disadvantage in that the workpiece can not substantially be released when the chuck is mounted on the main spindle.

In the case of the aforementioned chuck system disclosed in Japanese Utility Model Publication No. 62-28324, an air chamber in the case of a pneumatic system or an accumulator chamber in the case of a hydraulic system is installed in the chuck system. Therefore, even when the chuck is mounted on the main spindle, the fluid can be caused to flow into the air or accumulator chamber by pushing the release shaft, so that the workpiece can be removed. However, when it is intended to increase the gripping force while the chuck is mounted on the main spindle, or when it is intended to supply the fluid to the interior of the chuck during the rotation of the main spindle, high-pressure fluid must be supplied from the supply port again, so that an additional fluid piping must be connected to the supply port while the chuck is mounted on the main spindle.

In the case of the aforementioned chuck system disclosed in Japanese Utility Model Appln. Laid-Open No. 59-5210, the self-hold type chuck is mounted on the main spindle, and the jaws can not be opened and closed while the chuck is mounted on the main spindle. Therefore, there are problems in that the workpiece can not be removed and the gripping force can not be increased at the position of the main spindle.

In the case of the aforementioned chuck system disclosed in Japanese Patent Appln. Laid-Open No. 62-193710, although the jaws can be opened and closed while the chuck is mounted on the main spindle, there is a problem in that when the chuck is detached from the main spindle, the jaws are opened, so that the workpiece can not be gripped.

SUMMARY OF THE INVENTION

It is therefore an object of the present invention to eliminate the aforementioned problems and to provide a changeable chuck system, which can supply a fluid to a jaw operating cylinder in a chuck and which can open and close jaws by means of the jaw operating cylinder in the chuck, while the chuck is mounted on a main spindle serving as a chuck mounting portion on which the chuck is mounted.

It is another object of the present invention to provide a changeable chuck system, which can reduce the length of an accumulator provided in a chuck for maintaining the pressure of a confined fluid while preventing increase of the thickness of the chuck even if the accumulator is arranged so as to extend in the axial direction of the chuck.

It is further object of the present invention to provide a changeable chuck system, which can reduce the amount of dripping of a fluid remaining between a fluid connecting portion and a fluid supply portion separated from the fluid connecting portion when a chuck is disengaged from a chuck mounting portion after a supply/discharge portion provided in the chuck is connected to the fluid supply portion of the chuck mounting portion to supply a fluid to a jaw operating cylinder in the chuck.

It is still further object of the present invention to provide a changeable chuck system, which can hold jaws at a workpiece gripping position by means of a jaw operating cylinder operated by a pressurized fluid when a chuck is disengaged from a main spindle, and which can open the jaws by the operation of the jaw operating cylinder while the chuck is mounted on the main spindle.

An additional object of the present invention is to provide a changeable chuck usable in the above changeable chuck system.

In order to accomplish the aforementioned and other objects, according to the present invention, there is provided a changeable chuck system, wherein a supply/discharge connecting means of a chuck is connectable in communication with fluid supply/discharge means of a chuck mounting portion including a main spindle, so that jaws can be opened and closed by means of a jaw operating fluid cylinder provided in the chuck even when the chuck is mounted on the main spindle serving as a chuck mounting portion. In addition, according to the present invention, the changeable chuck system may be provided with an accumulator having a multistage piston structure for maintaining the pressure in the chuck. The changeable chuck system may also be provided with springs for biasing a plurality of pistons in a pressurizing direction. The springs may be arranged such that their positions in the axial direction are overlapped. Further, according to the present invention, the changeable chuck system may be provided with a suction mechanism which can suck a fluid remaining between the supply/discharge connecting means of the chuck and the fluid supply means of the chuck mounting portion when the supply/discharge connecting means is disengaged from the fluid supply means. Moreover, according to the present invention, the changeable chuck system is provided with fluid supply/discharge connecting means for operating jaws in a main spindle, so that the supply/discharge connecting means of the main spindle faces the supply/discharge connecting means of the chuck to be communicated therewith when the chuck is mounted on the chuck mounting portion including the main spindle, thereby allowing the jaw operating cylinder to operate when the chuck is mounted on the main spindle.

According to another aspect of the present invention, a changeable chuck system comprises gripping jaws, a jaw operating cylinder, and a supply/discharge connecting means connected to the jaw operating cylinder via a check valve. The jaw operating cylinder may be actuated by pressurized fluid supplied from the supply/discharge connecting means so that a workpiece can be gripped on and released from a chuck mounting portion other than the main spindle. While the workpiece is gripped by maintaining the supplied fluid pressure by means of the check valve, the chuck may be detachably mounted on a main spindle of a machine tool serving as a chuck mounting portion. When the chuck is mounted on the main spindle, the supply/discharge connecting means of the chuck is communicated with a fluid supply portion provided in the main spindle, so that the jaws can be operated by the action of the jaw operating cylinder operated by fluid even when the chuck is mounted on the main spindle. Thus, even when the chuck is mounted on the main spindle, the jaw operating cylinder in the chuck can be operated without connecting an additional piping thereto.

The chuck may be provided with an accumulator which is communicated with a cylinder chamber of the jaw operating cylinder in which the fluid pressure is maintained by means of the check valve. The accumulator may have a multistage piston structure wherein a plurality of pressure hold pistons are received so as to be movable in axial directions. The respective pistons may be biased in pressurizing directions by means of pressure hold springs having different stiffness. The pressure hold springs may be arranged so that the axial positions of outside and inside springs are overlapped. Thus, when the springs are overlapped in the axial direction, the length of the accumulator in the direction of piston stroke can be made shorter than those of conventional accumulators wherein a single spring is arranged in series to a single piston, so that it is possible to prevent the thickness of the chuck from increasing even when the accumulator is arranged to extend in the axial direction of the chuck.

The supply/discharge connecting means of the chuck may be provided with a fluid suction unit for sucking fluid, which remains between the supply/discharge connecting means and the fluid supply/discharge means of the chuck mounting portion, toward the check valve of the chuck when the chuck is detached from the chuck mounting portion. The chuck may be mounted on and detached from the chuck mounting portion in the axial directions. The fluid supply/discharge means of the chuck mounting portion may be provided with a fluid shut-off valve so as to face the chuck. The supply/discharge connecting means of the chuck may be provided with a communication passage. In the communication passage, a suction piston may be fitted into a suction chamber so as to be movable by a predetermined stroke and to be biased toward the fluid shut-off valve. The communication passage may be in communication with a fluid passage establishing a communication between the suction chamber and the check valve. The communication passage may establish a communication between the suction chamber and the fluid shut-off valve of the chuck mounting portion. The supply/discharge connecting means of the chuck may be also provided with a fluid suction unit for allowing the fluid shut-off valve to move the suction piston to supply the fluid to the chuck when the chuck is mounted on the chuck mounting portion. In the fluid suction unit, when the chuck is detached from the chuck mounting portion, a suction stroke is left so that the suction piston can move toward the chuck mounting portion after the fluid shut-off valve is closed. When the suction piston moves by the remaining stroke to produce a negative pressure in the suction chamber to suck the remaining fluid between the fluid shut-off valve and the fluid supply/discharge means of the chuck mounting portion. Thus, when the chuck is detached from the chuck mounting portion, fluid remaining between the fluid shut-off valve and the communication hole is sucked toward the check valve via the communication hole, so that it is particularly possible to reduce the amount of the oil dripping to the outside and to reduce the amount of the working oil to be supplied. So this is economical.

The fluid shut-off valve may be provided with a valve element. The valve element is received in a fixed cylindrical insertion member so as to be slidable in axial directions. The tip of the cylindrical insertion member may project from the base of the chuck mounting portion, and the tip of the valve element may project from a supply port. A pushing shaft fixed to the chuck may pass through the center of the suction piston of the fluid suction unit so as to be coaxial with the tip of the valve element when the chuck is mounted on or detached from the chuck mounting portion. When the chuck is mounted on the chuck mounting portion, the cylindrical insertion member may push the suction piston by a predetermined stroke, and the pushing shaft may push the valve element. When the chuck is detached from the chuck mounting portion, the valve element is closed at an intermediate position of the detachment while the suction stroke of the suction piston still remains. Thus, by the relative movement of the fluid shut-off valve to the chuck, the fluid shut-off valve of the chuck mounting portion is opened when the chuck is mounted on the chuck mounting portion, and closed when the chuck is detached from the chuck mounting portion. Therefore, it is not required to provide any additional driving sources for opening and closing the shut-off valve of the chuck mounting portion.

In the changeable chuck system according to the present invention, the chuck may have gripping jaws for gripping a workpiece, a jaw operating cylinder for operating the jaws by pressurized fluid, and a pressurized-fluid supply/discharge connecting means connected to the jaw operating cylinder via a check valve. The main spindle of the machine tool may be provided with chuck mounting means for allowing the chuck to be mounted and detached. The chuck may be moved by chuck moving means to be mounted on and detached from the chuck mounting portion of the main spindle. In this changeable chuck system, the main spindle may be provided with fluid supply/discharge means for operating jaws. When the chuck is mounted on the main spindle, the supply/discharge means of the main spindle faces the supply/discharge connecting means of the chuck to establish communication therebetween, so that the jaw operating cylinder of the chuck can operate the jaws while the chuck is mounted on the main spindle.

The chuck moving means is preferably means having changing arms which is pivotably mounted on the frame of a machine tool, but it may be means using a robot which is provided separately from the machine tool. In addition, the chuck mounting means may be means for detachably mounting a chuck on the main spindle, so that it should not be limited to the preferred embodiments.

A changeable chuck for a machine tool according to the present invention comprises: gripping jaws for gripping a workpiece; a jaw operating fluid cylinder for moving the gripping jaws between a workpiece gripping position and a workpiece releasing position; fluid supply/discharge connecting means for supplying therethrough a pressurized fluid to the jaw operating fluid cylinder and for discharging therethrough the pressurized fluid from the jaw operating fluid cylinder; a check valve provided between the jaw operating fluid cylinder and the fluid supply/discharge connecting means; said changeable chuck being capable of gripping and releasing the workpiece by pressurized fluid supplied from a chuck mounting portion including the main spindle to the fluid supply/discharge connecting means when the changeable chuck is mounted on said chuck mounting portion including the main spindle; said check valve being capable of preventing leakage of the pressurized fluid supplied to said jaw operating fluid cylinder out of said cylinder to maintain the workpiece in a gripped state, whereby said chuck is allowed to be detached from a chuck mounting portion to be mounted on another chuck mounting portion while the chuck is gripping the workpiece; and said fluid supply/discharge connecting means including suction means for sucking fluid remaining therein toward said check valve while the chuck is being detached from the chuck mounting portion.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIG. 1B is an enlarged view of a part of FIG. 1A;

DESCRIPTION OF THE PREFERRED EMBODIMENTS

Referring now to the accompanying drawings, preferred embodiments of an exchangeable chuck system, according to the present invention, will be described below.

Figure 11:
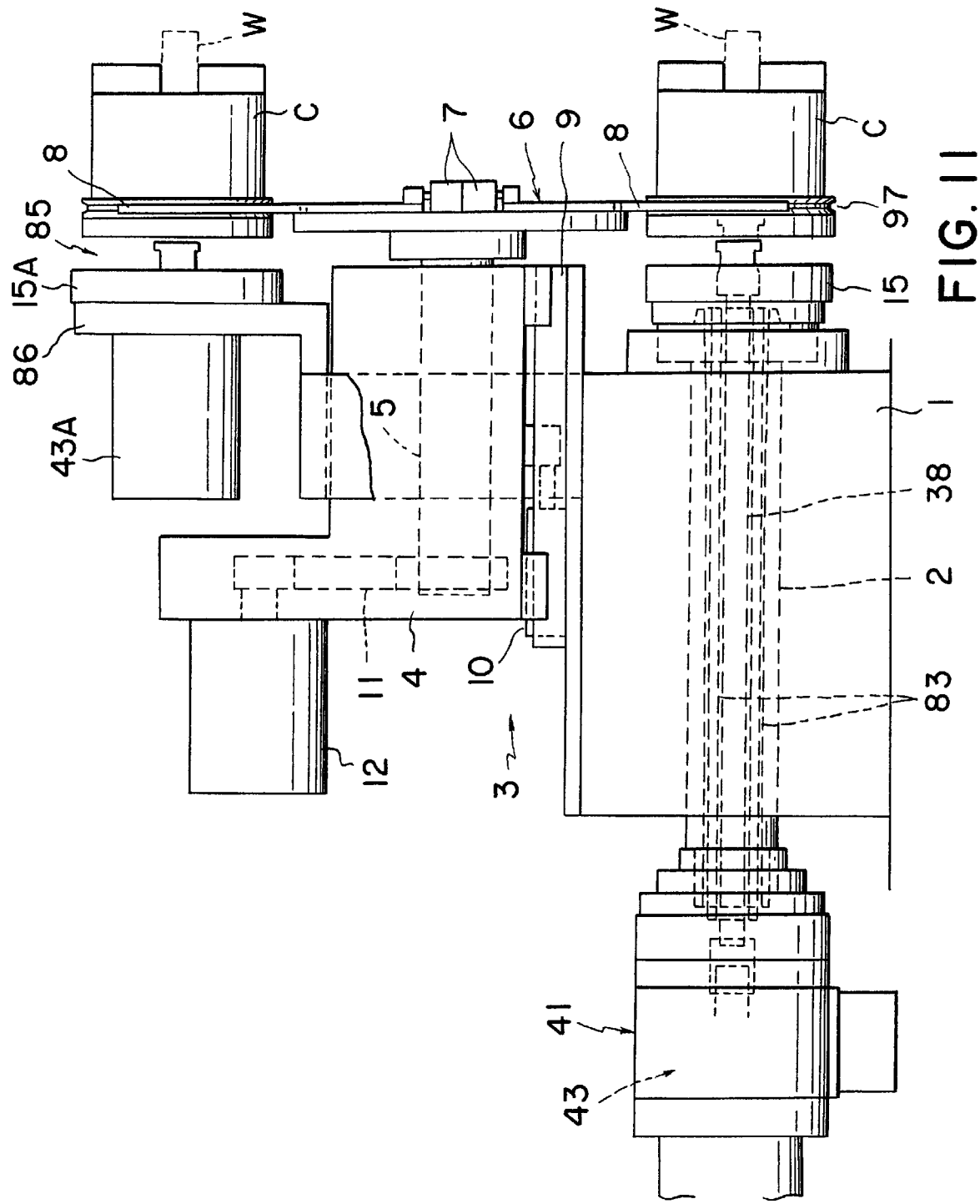
FIG. 11 is a side view of a preferred embodiment of a chuck system according to the present invention.

FIG. 11 shows an arm-pivoting type changeable chuck system wherein two chucks C can be exchangeably mounted on a hollow main spindle 2 and a workpiece mounting station 85 so that any one of the chucks C can be automatically mounted on the main spindle 2. In FIG. 11, the hollow main shaft 2 is rotatably supported on a main-spindle head 1. The main spindle 2 is rotated by means of a motor built in the main-spindle head 1. On the upper surface of the main-spindle head 1, chuck moving means 3 is provided. The chuck moving means 3 comprises a body 4 and an arm shaft 5 pivotably supported on the body 4. A changing arm 6 is mounted on the tip of the arm shaft 5 at an intermediate portion thereof. A pair of opening/closing arms 8, which are open and closed by means of an opening/closing cylinder 7, are provided on both ends of the changing arm 6, respectively. The opening/closing arms 8 are designed to grip gripping grooves 97 formed in the outer peripheries of the chucks C, respectively. The body 4 is guided by means of a guide rail 9 in the axial direction of the arm shaft 5, so as to move forwards and backwards in the axial directions by a predetermined distance by means of a cylinder 10. The arm shaft 5 is rotated by 180 degrees by means of a rotary motor 12 via a train of gears 11 in the body 4, so that the positions of the opening/closing arms 8, i.e., the positions of the two chucks C held by the opening/closing arms 8, are changed, by 180 degrees, between a position at which the chuck C is coaxial with the main spindle 2 and a position at which the chuck C is coaxial with a piston rod 50 (FIG. 5) of a clamp cylinder 43A of the workpiece mounting station 85 set above the body 4, which will be described later.

Figure 1A:
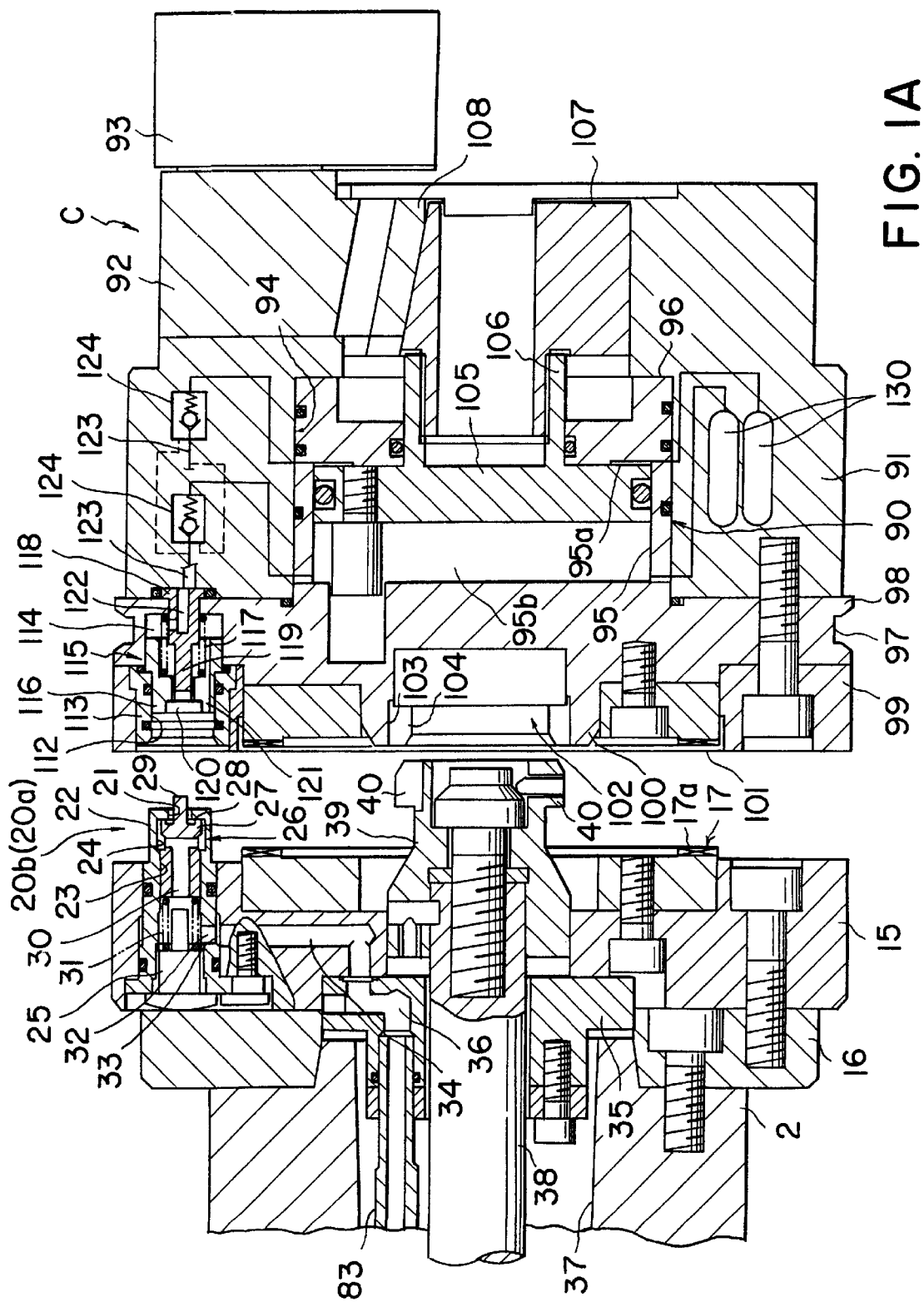
FIG. 1A is a sectional view of the tip of a main spindle and a chuck.
Figure 2:
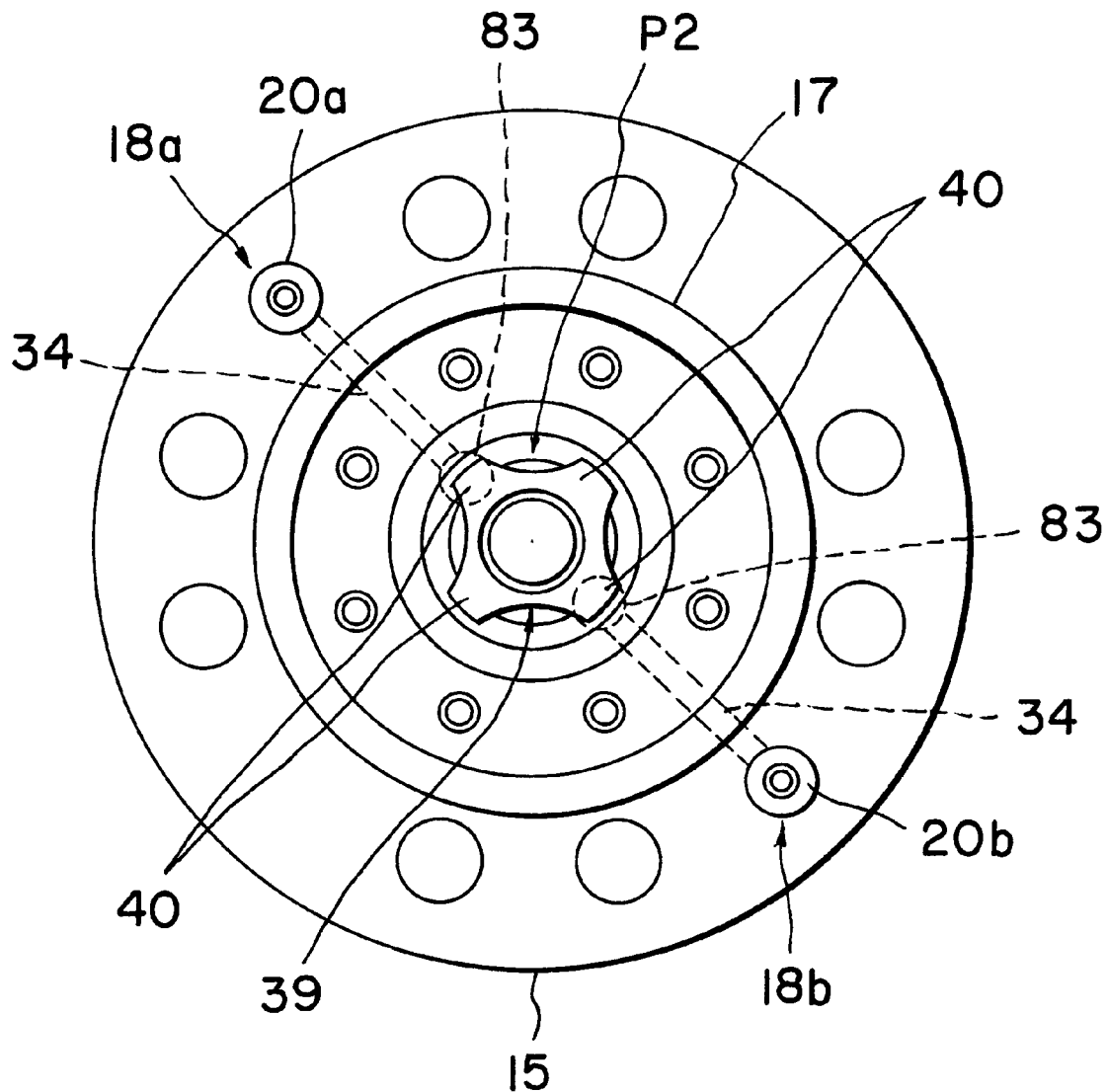
FIG. 2 is a front view of a detachable adapter on the tip of a main spindle in a chuck unclamped state.

The tip of the main spindle 2 serves as a chuck mounting portion, on which the chuck C is detachably mounted. As shown in FIG. 1A, a mounting adapter (base) 15 is mounted on the tip of the main spindle 2. The mounting adapter 15 is connected to the main spindle 2 via a mounting plate 16. A coupling 17 having a plurality of engaging teeth 17a arranged in an annular form is fixed to the mounting adapter 15 so as to face forwards. As shown in FIG. 2, the mounting adapter 15 is provided with a pair of fluid supply portions 18a and 18b which are arranged symmetrically so as to extend in inclined directions of 45 degrees when the main spindle 2 is stopped. The fluid supply portion 18a and 18b are provided with fluid shut-off valves 20a and 20b, respectively. As will be described later, the upper-left shut-off valve 20a as viewed in FIG. 2 is adapted to be communicated with a front cylinder chamber 95a (FIG. 1A) of a jaw operating cylinder 90 arranged in the chuck C, and the lower-right shut-off valve 20b is adapted to be communicated with a rear cylinder chamber 95b of the jaw operating cylinder 90. Since the respective fluid shut-off valves 20a and 20b have the same structure, one 20b of the fluid shut-off valves will be described.

As shown in FIG. 1A and FIG. 1B which is an enlarged view of a part of FIG. 1A, a hollow cylindrical insertion member 22 having a supply port 21 in the front wall thereof is fluid-tightly fixed to the mounting adapter 15 so that the tip of the cylindrical insertion member 22 projects from the front face of the mounting adapter 15. The cylindrical insertion member 22 defines therein a bore 23. The bore 23 has a large-diameter portion 24 on the side of the front wall. The rear end of the bore 23 is closed by a spring retaining member 25 which engages the rear end of the bore 23. A valve element 26 is fitted into the bore 23 so as to be movable in axial directions between the spring retaining member 25 and the front wall of the cylindrical insertion member 22. The valve element 26 has a valve head 27 having a smaller diameter than the large-diameter portion 24. The valve head 27 is provided with a ring-shaped sealing member 28 for sealing a gap between the valve head 27 and the edge portion (the internal surface of the front wall) of the supply port 21. A projecting shaft 29 having a still smaller diameter extends from the valve head 27 so that the tip of the projecting stud 29 projects forwards from the supply port 21 formed in the front wall of the cylindrical insertion member 22. The valve element 26 has a fluid passage 30 at the center thereof. The fluid passage 30 turns to a radial direction immediately behind the valve head 27 to be in communication with the large-diameter portion 24. A spring 31 is provided between the valve element 26 and the spring retaining member 25 so as to bias the valve element 26 toward the front wall of the cylindrical insertion member 22. Thus, when the valve element 26 is not pushed axially rearwards, the sealing member 28 of the valve element 26 is brought into tight contact with the internal surface of the front wall of the cylindrical insertion member 22 so as to close the supply port 21. The cylindrical wall of the cylindrical insertion member 22 has a communication hole 32 which is in communication with the bore 23 between the valve element 26 and the spring contact surface of the spring retaining member 25. The communication hole 32 is also in communication with a supply/discharge pipe 83 (which will be described later) via an annular fluid passage 33 formed between the outer periphery of the cylindrical insertion member 22 and the mounting adapter 15, a fluid passage 34 in the mounting adapter 15, and a fluid passage 36 of an auxiliary adapter 35 provided between the main spindle 2 and the mounting adapter 15.

The main spindle 2 has a bore 37 for receiving therein a draw bar 38 which is movable in axial directions. The tip of the draw bar 38 is integrally formed with a retractable block 39. As shown in FIG. 2, the retractable block 39 has four retractable claws 40 arranged at circumferential regular intervals. Furthermore, when the machining is completed, the main spindle 2 is controlled so as to be always stopped at an angular position shown in FIG. 2, i.e., at an angular position at which the shut-off valve 20a is positioned at an upper-left position and the shut-off valve 20b is positioned at a lower-right position.

Figure 3:
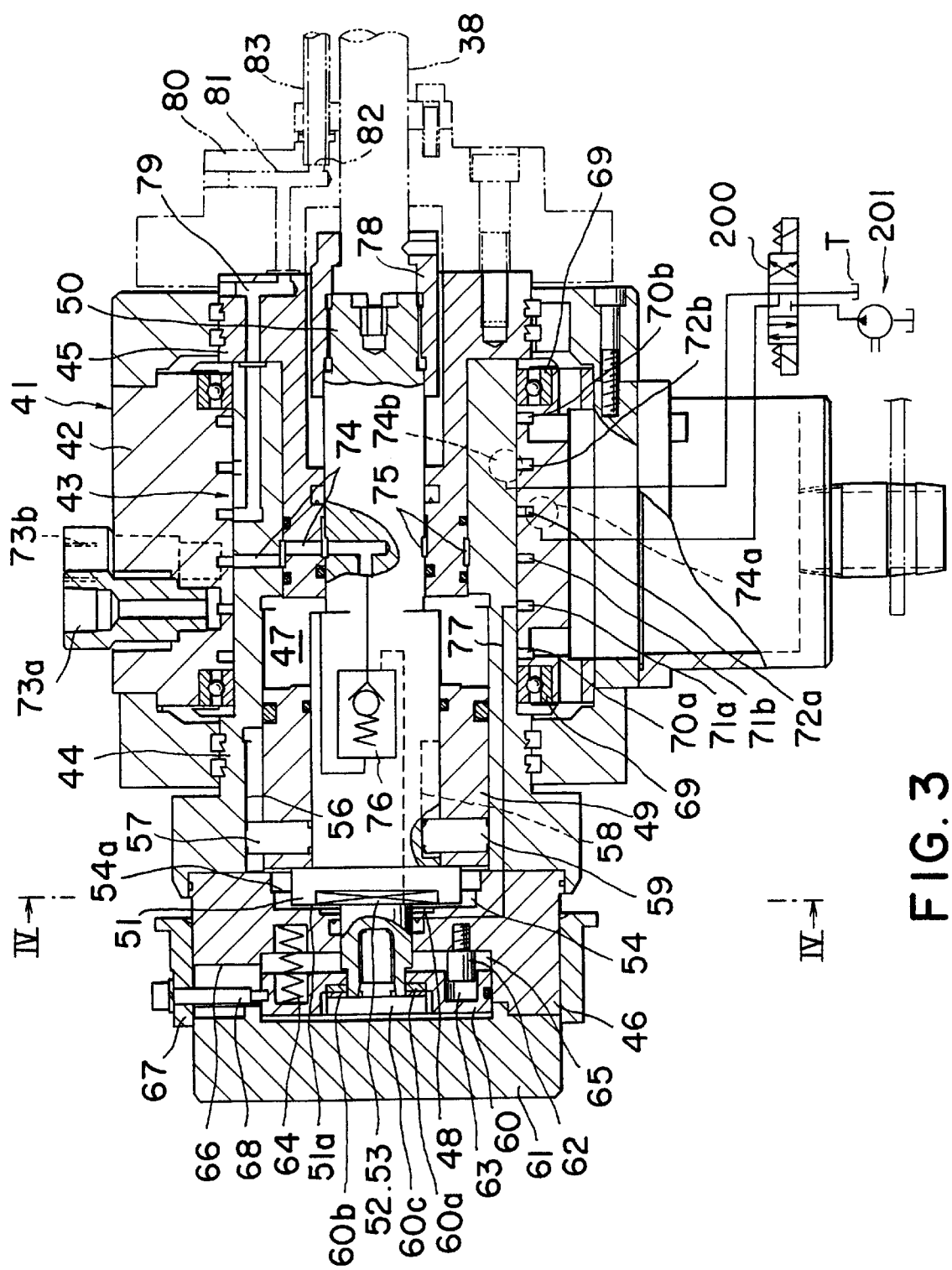
FIG. 3 is a sectional view of a rotating clamp cylinder in a chuck clamped state.

As shown in FIG. 3, the rear end of the main spindle 2 is provided with a rotating clamp cylinder device 41. FIG. 3 shows a state in which the chuck is clamped. In the rotating clamp cylinder device 41, a clamp cylinder 43 is rotatably supported on bearings 69 inside of a distributor body 42. The clamp cylinder 43 is so-called limited-pivoting clamp cylinder. In the clamp cylinder 43, the front and rear ends of a cylinder body 44 are closed by a rod-side end cap 45 and a head-side end cap 46 to define therein a cylinder chamber.

This cylinder chamber is divided into front and rear cylinder chambers 47 and 48 by means of a piston 49. A piston rod 50 is rotatably fitted into the piston 49. The piston rod 50 has a large-diameter portion 51 on the side of the head thereof.

As shown in FIG. 4, the large-diameter portion 51 has two flat-surface portions serving as engaging portions 52. The head-side end cap 46 is formed with an engaging hole 54 having two flat-surface portions 53 which engage the engaging portions 52. When the piston rod 50 is positioned at a forward end position, the engaging portions 52 is disengaged from the engaging hole 54, and a rear face 51a of the large-diameter portion 51 is positioned slightly in front of a front face 54a of the engaging hole 54, so that the piston rod 50 is rotatable.

The cylinder body 44 has a guide groove 56 which is parallel to the axis thereof. The guide groove 56 is designed to guide a pin 57, which is integral with the piston 49 and which projects radially outwards, to prevent rotary movement of the piston 49. The outer periphery of the piston rod 50 has a lead groove 58 which is inclined with respect to the axis of the piston rod 50. The lead groove 58 is designed to guide a pin 59, which is integral with the piston 49 and which projects radially inwards. The rear end of the piston rod 50 passes through the head-side end cap 46. To the rear end of the piston rod 50, a biasing ring 60 is rotatably connected via a thrust bearing 60a, a washer 60b and a bolt 60c. The biasing ring 60 is located in a moving space 65, which is defined by the head-side end cap 46 and a rear lid 61 fixed to the head-side end cap 46, so as to be movable in axial directions.

The engagement of a stud 62 with a guide groove 63 prevents pivotal movement of the biasing ring 60 with respect to the cylinder body 44. Between the biasing ring 60 and the head-side end cap 46, a compression spring 64 is provided. This compression spring 64 forms a clamp holding mechanism for always drawing the piston rod 50 backwards (i.e., in a clamping direction). The head-side end cap 46 has an elongated groove 66, which is in communication with the moving space 65 and which extends forwards and backwards. An axial position detecting ring 67 of the piston rod 50 engages the outer periphery of the heat-side end cap 46 so as to be movable in axial directions. An elongated bolt 68 engaging the axial position detecting ring 67 passes through the elongated groove 66 to be connected to the outer peripheral wall of the biasing ring 60.

The respective elements, such as the mounting adapter 15, the draw bar 38, the retractable claw 40, the clamp cylinder 42, the biasing ring 60 and the compression spring 64, form chuck mounting means for detachably mounting the chucks C on the main spindle 2.

In the internal surfaces of the distributor body 42 receiving therein the cylinder body 44, six annular grooves 70a, 70b, 71a, 71b, 72a and 72b are formed between the bearings 69. Two grooves on both ends are drain recovery grooves 70a and 70b. Out of the remaining four grooves, two grooves on the rear side are grooves 71a and 71b for supplying a fluid to and discharging the fluid from the front and rear cylinder chambers 47 and 48 of the clamp cylinder 43, and two grooves on the front side are grooves 72a and 72b for supplying a fluid to the two fluid shut-off valves 20a and 20b of the mounting adapter 15. The grooves 71a, 71b, 72a and 72b are in communication with four supply/discharge ports 73a, 73b, 74a and 74b, respectively, which are provided in the outer periphery of the distributor body 42 so that the phases thereof in circumferential and axial directions are different so as not to interfere with each other.

The supply/discharge ports 73a, 73b, 74a and 74b are connected via a fluid source 201 and directional control valves. In particular, a directional control valve 200, by which two load-side ports are in communication with a fluid reservoir T, is connected to the supply/discharge ports 74a and 74b at the shown neutral position.

Out of the pair of annular grooves 71a and 71b for supplying a fluid to the clamp cylinder 43 and for discharging the fluid from the clamp cylinder 43, one annular groove 71b is in communication with a check valve 76 provided in the piston rod 50, via a cylinder body 44, a fluid passage 74 provided in the rod-side end cap 45, a gap between the piston rod 50 and the rod-side end cap 45, and an annular groove 75 provided between the cylinder body 44 and the rod-side end cap 45, so that the fluid is supplied to the front cylinder chamber 47 via the check valve 76. The other annular groove 7 la is in communication with the rear cylinder chamber 48 behind the engaging hole 54 via a fluid passage 77 provided in the cylinder body 44 and the head-side end cap 46. To the tip of the piston rod 50, the rear end of the draw bar 38 is connected via a connector 78 so as to prevent rotary movement thereof. In addition, the pair of annular grooves 72a and 72b for supplying the fluid to the fluid shut-off valves 20a and 20b and for discharging the fluid therefrom are in communication with a fluid passage 81, which is provided in a mounting adapter 80 on the rear end of the main spindle 2, via a fluid passage 79 which is separately formed in the cylinder body 44 and the rod-side end cap 45. The mounting adapter 80 has a pair of fluid openings 82 which are in communication with supply/discharge pipes 83, respectively. These two supply/discharge pipes 83 are arranged in a space between the bore 37 of the main spindle 2 and the draw bar 38, and connected to the pair of fluid passages 36 of the auxiliary adapter 35 on the tip of the main spindle 2.

Figure 4A:
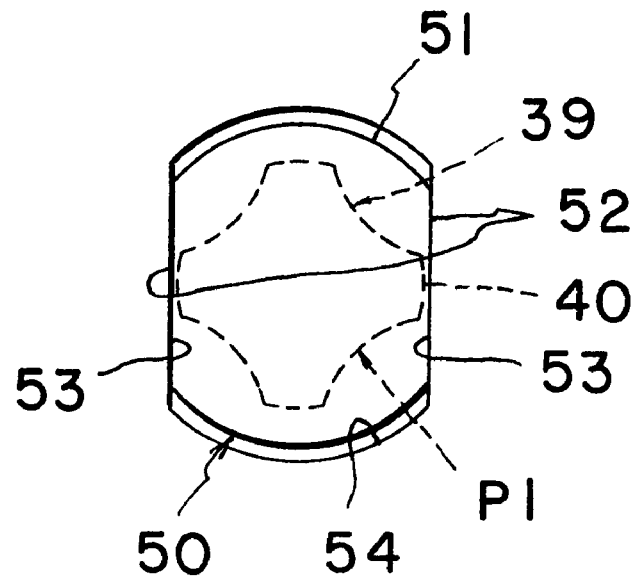
FIG. 4A is a view showing the relationship between an engaging portion of a piston rod and retractable claws in a chuck clamped state.

The draw bar 38, i.e., the piston rod 50 and the retractable block 39, are mounted so that the retractable jaws 40 of the retractable block 39 are positioned at positions shown in FIG. 4A with respect to the engaging portion 52 of the large-diameter portion 51. In this preferred embodiment, when the engaging portion 52 engages the engaging hole 54 so as to be positioned at a position shown in FIG. 4A with respect to the engaging hole 54, the retractable claws 40 are positioned at angular positions so as to face engaging claws 104 of an engaging portion 102 behind the chuck C (i.e., a clamped angular position P1).

Figure 10:
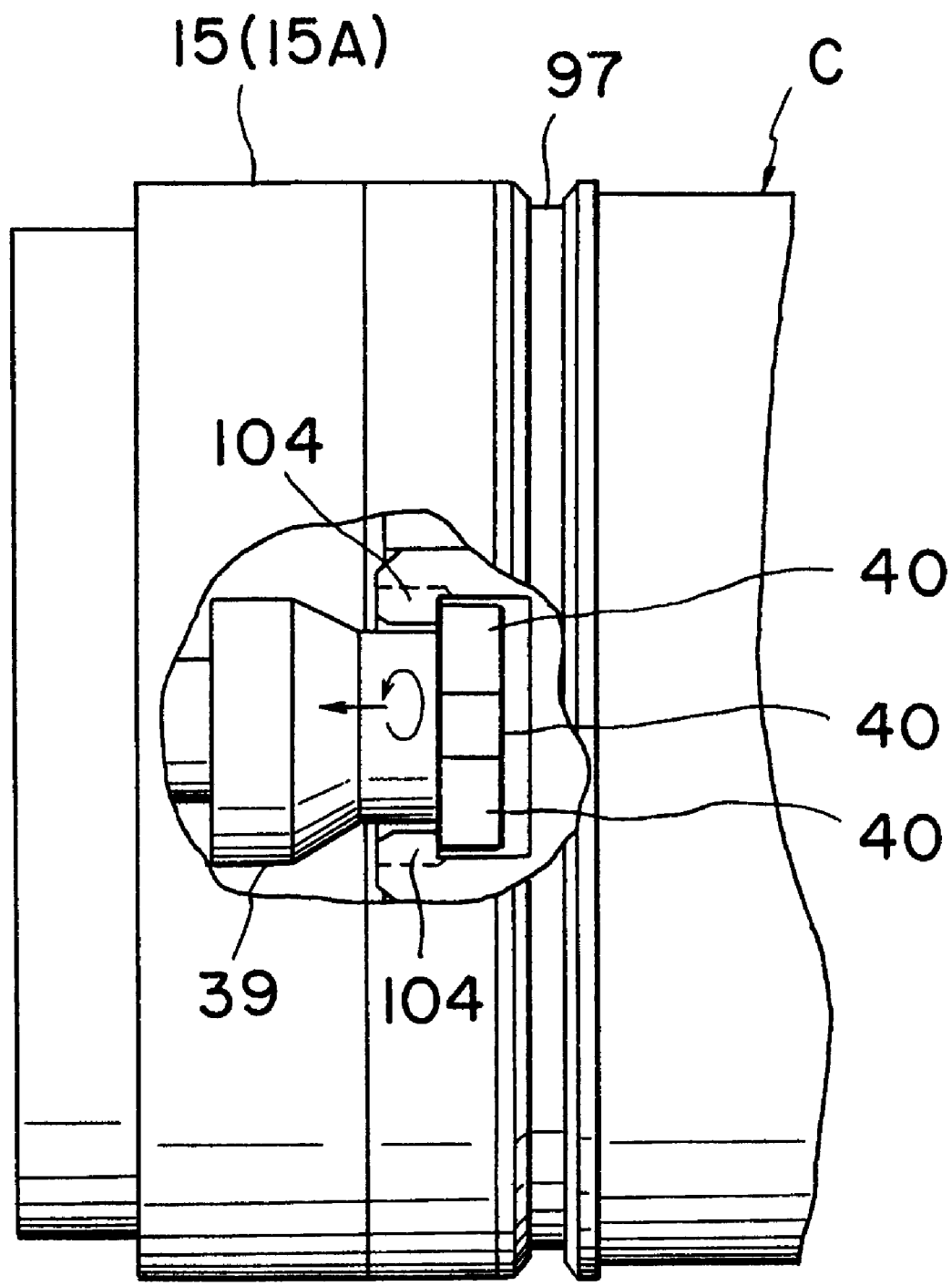
FIG. 10 is a view showing the relationship between retractable claws and engaging claws in a chuck clamped state.

Then, as shown in FIG. 3, when fluid is supplied to the rear cylinder chamber 48, the piston rod 50 and the piston 49 move forwards from the position at which the piston rod 50 is clamped (at this position, the engaging claws 104 of the chuck C are drawn in an axial direction to clamp the chuck C as shown in FIG. 10). When the piston rod 50 moves to the forward limit end thereof, the engaging portion 52 is disengaged from the engaging hole 54. Thereafter, only the piston 49 moves forwards to the forward limit end thereof with respect to the piston rod 50. As a result, the piston rod 50 is rotated by means of the inclined lead groove 58.

Figure 4B:
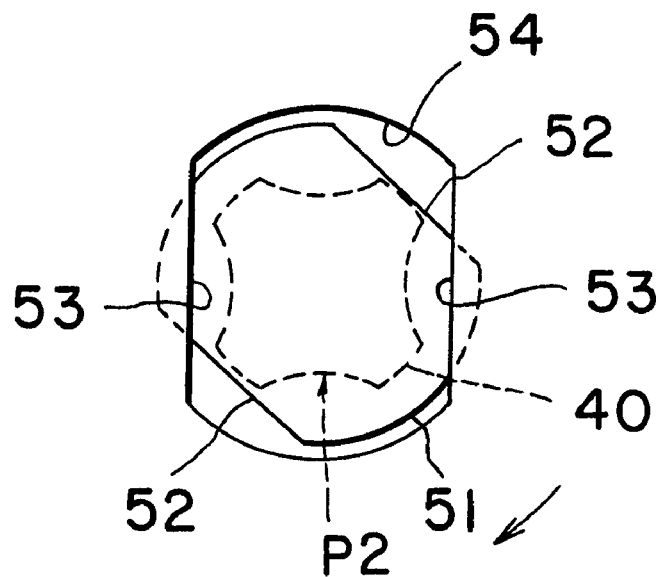
FIG. 4B is a view showing the relationship between an engaging portion of the piston rod and the retractable claws in a chuck unclamped state.

At the forward end position of the piston rod 50 (at this time, the retractable block 39 is in an unclamped state in which the retractable claws 40 do not engage the engaging claws 104 in the axial direction in the engaging hole 102 of the chuck C which will be described later), the piston rod 50 is rotated by 45 degrees, and the retractable claws 40 is rotated to an angular position shown in FIG. 4B (an unclamped angular position P2). Further, when the fluid is supplied to the front cylinder 47 at the forward end position of the piston rod 50, the piston rod 50 can not move rearwards since the rear face 51a of the large-diameter portion 51 thereof abuts the front face 54a of the engaging hole 54. Therefore, only the piston 49 is moved rearwards with respect to the piston rod 50, and the piston rod 50 is rotated by means of the inclined lead groove 58, so that the retractable claws 40 on the front end thereof are rotated by 45 degrees from the unclamped angular position P2 to the clamped angular position P1. Then, when the retractable claws 40 reach the clamped angular position P1, the engaging portion 52 becomes engageable with the engaging hole 54, so that the piston 49 contacts the large-diameter portion 51 of the piston rod 50 whereby the piston rod 50 is moved rearwards to obtain the clamped state.

Figure 5:
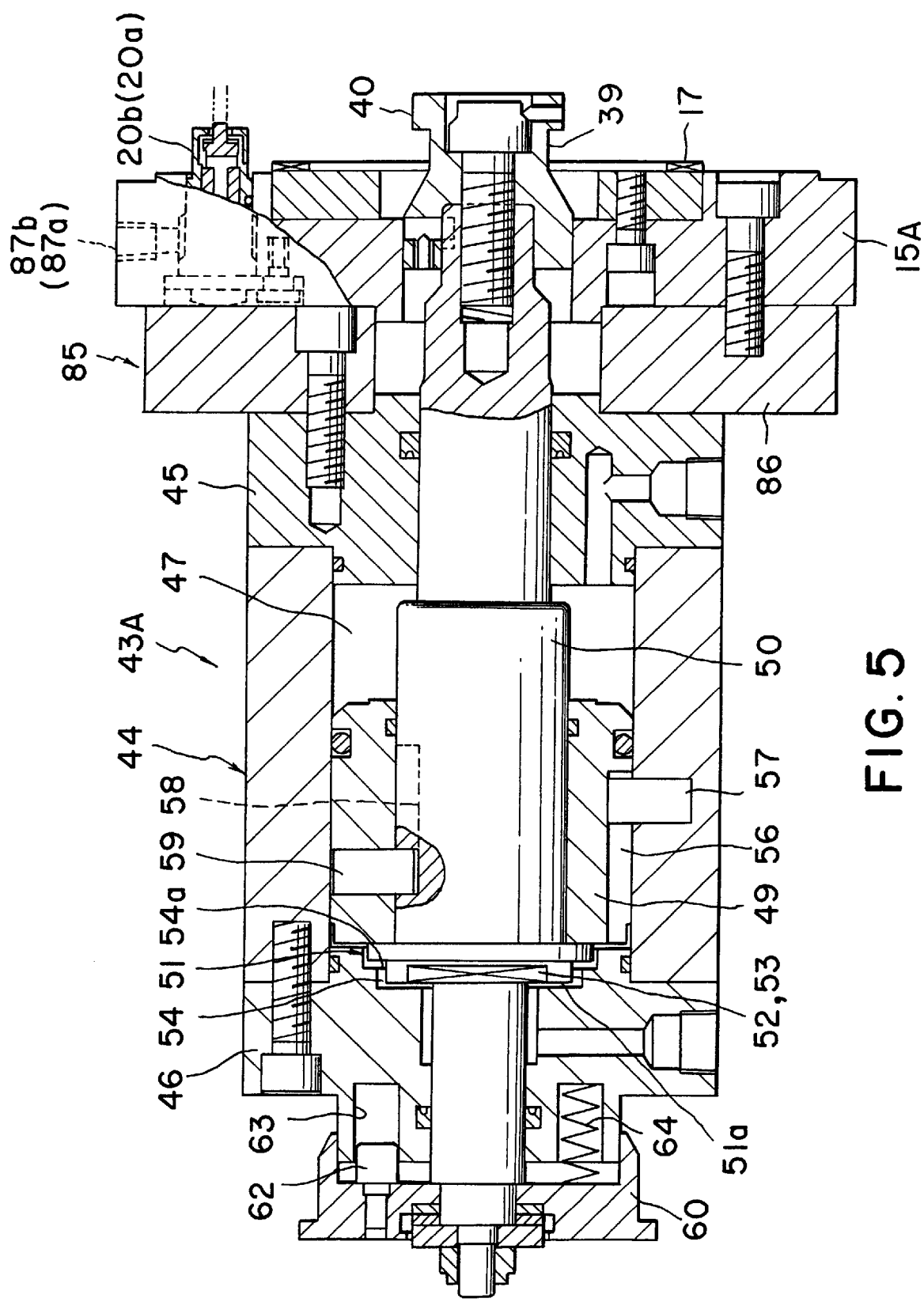
FIG. 5 is a sectional view of a clamp cylinder of a workpiece mounting station in a chuck clamped state.

The same type of limited rotary movement cylinder is also provided in the workpiece mounting station 85. As shown in FIG. 11, a clamp cylinder 43A is fixed to a bracket (base) 86, which is integral with the main-spindle head 1 so as to straddle the body 4 of the chuck moving means 3. As shown in FIG. 5, the cylinder body 44 closed by the end caps 45 and 46 is fixed to the clamp cylinder 43A so as to prevent the rotation thereof. The basic structure of the limited rotary movement cylinder 43A is the same as that of the aforementioned rotating clamp cylinder, except that the guide groove 56 for preventing the rotary movement of the piston 49 is formed in the piston 49, no check valve is provided therein and fluid passages different from those of the aforementioned rotating clamp cylinder are formed. Therefore, the same reference numbers are used for the corresponding elements, and explanation therefor is omitted.

The angular positions of the retractable claws 40 of the retractable block 39, which is mounted on the tip of the piston rod 50, with respect to the two flat-surface portions of the engaging portion 52 are the same as those in the aforementioned preferred embodiment. The front face of the bracket 86 serves as a chuck mounting portion, to which a mounting adapter 15A is fixed. Similar to the mounting adapter mounted on the tip of the main spindle 2, the mounting adapter 15A is provided with an annular coupling 17 on the front face thereof. In addition, at the same positional relationship as that of the mounting adapter 15 of the main spindle 2, the same two fluid supply/discharge portions 18a and 18b as those shown in FIG. 2 are provided.

Figure 12:
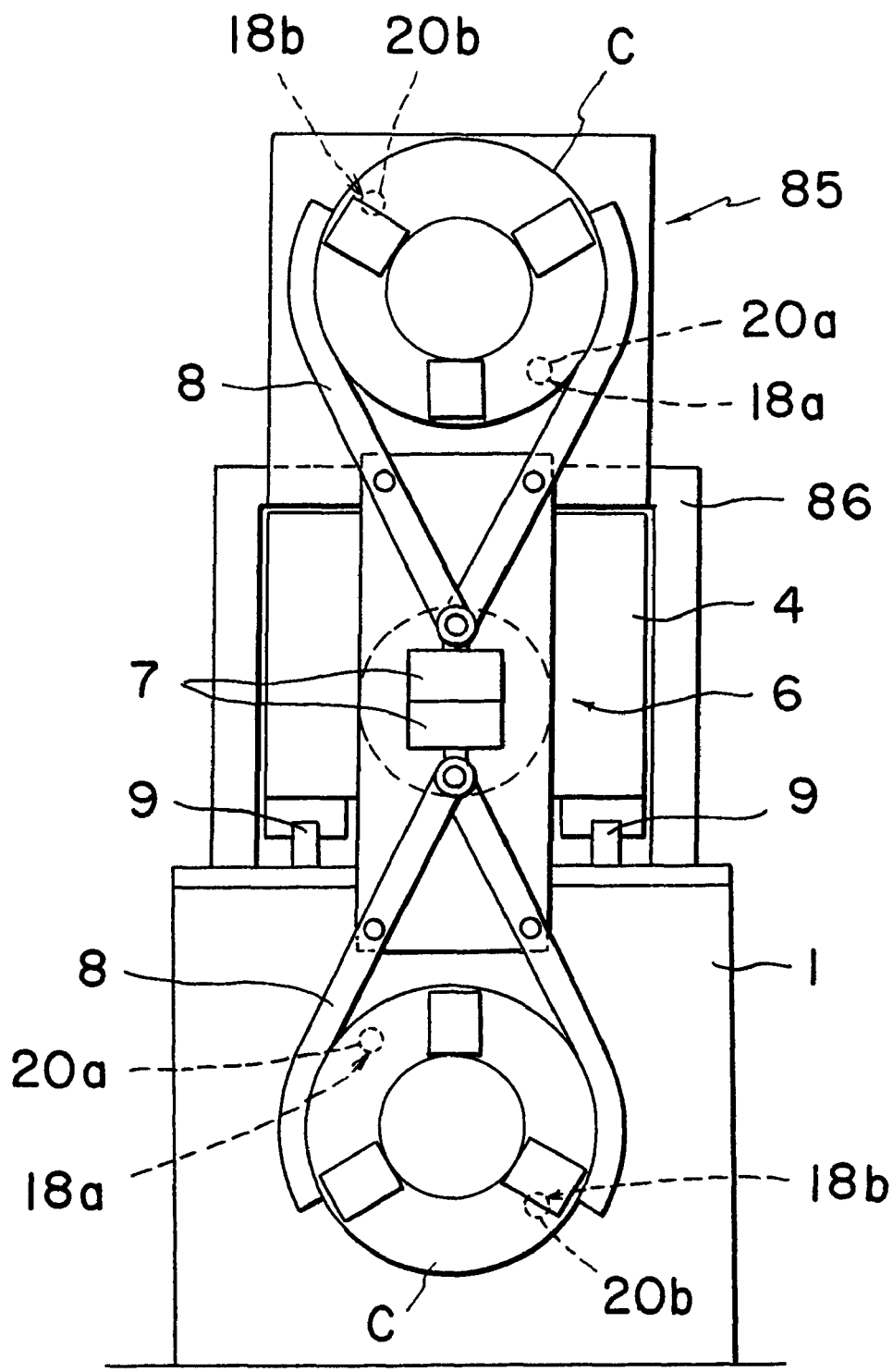
FIG. 12 is a front view of the chuck system of FIG. 11.

The fluid supply/discharge portions 18a and 18b are provided with the same fluid shut-off valves 20a and 20b as those in the aforementioned preferred embodiment. The mounting adapter 15A is provided with a pair of fluid ports 87a and 87b which are communicated with the annular fluid passages of the pair of the fluid shut-off valves 20a and 20b. These fluid ports 87a and 87b are connected to a fluid source via the same directional control valve (not shown) as the aforementioned directional control valve 200 (FIG. 3). In this mounting adapter 15A of the workpiece mounting station 85, since the chuck C mounted on the main spindle 2 is rotated by 180 degrees by the chuck moving means 3, the upper-left fluid shut-off valve 20b in FIG. 12 is communicated with the rear cylinder chamber 95b of the jaw operating cylinder 90 of a changing chuck C (FIG. 1), which will be described later, and the lower-right fluid shut-off valve 20a in FIG. 12 is communicated with the front cylinder chamber 95a thereof.

The changing chuck C, which is to be detachably mounted on the main spindle 2 or the workpiece mounting station 85, will be described below.

In FIG. 1A, a plurality (three) of master jaws 92 are guided on a chuck body 91 so as to be movable in radial directions. Each of the master jaws 92 is fixed to a gripping jaw 93. The chuck body 91 is formed with a cylinder-body receiving hole 94, the rear end of which is open. The cylinder-body receiving hole 94 receives therein a cylinder body 96 having a cylinder hole 95, the rear end of which is open. On the rear face of the chuck body 91, a clamping member 98 having a gripping groove 97, which is gripped by the opening/closing arm 8 of the chuck moving means 3, together with an annular fixing member 99, is clamped to close the rear end of the cylinder hole 95 to define a cylinder chamber. The clamping member 98 has a small-diameter portion 100 at the rear thereof. An annular coupling 101 having a plurality of teeth engaging the coupling 17 of the mounting adapter 15 (15A) is fixed so as to surround the small-diameter portion 100 of the clamping member 98. At the center of the small-diameter portion 100 (on the axis of the chuck), an engaging portion 102 (an engaging recessed portion) being engageable with the retractable claws 40 is provided. The engaging portion 102 is a stepped hole extending inwardly.

Figure 6:
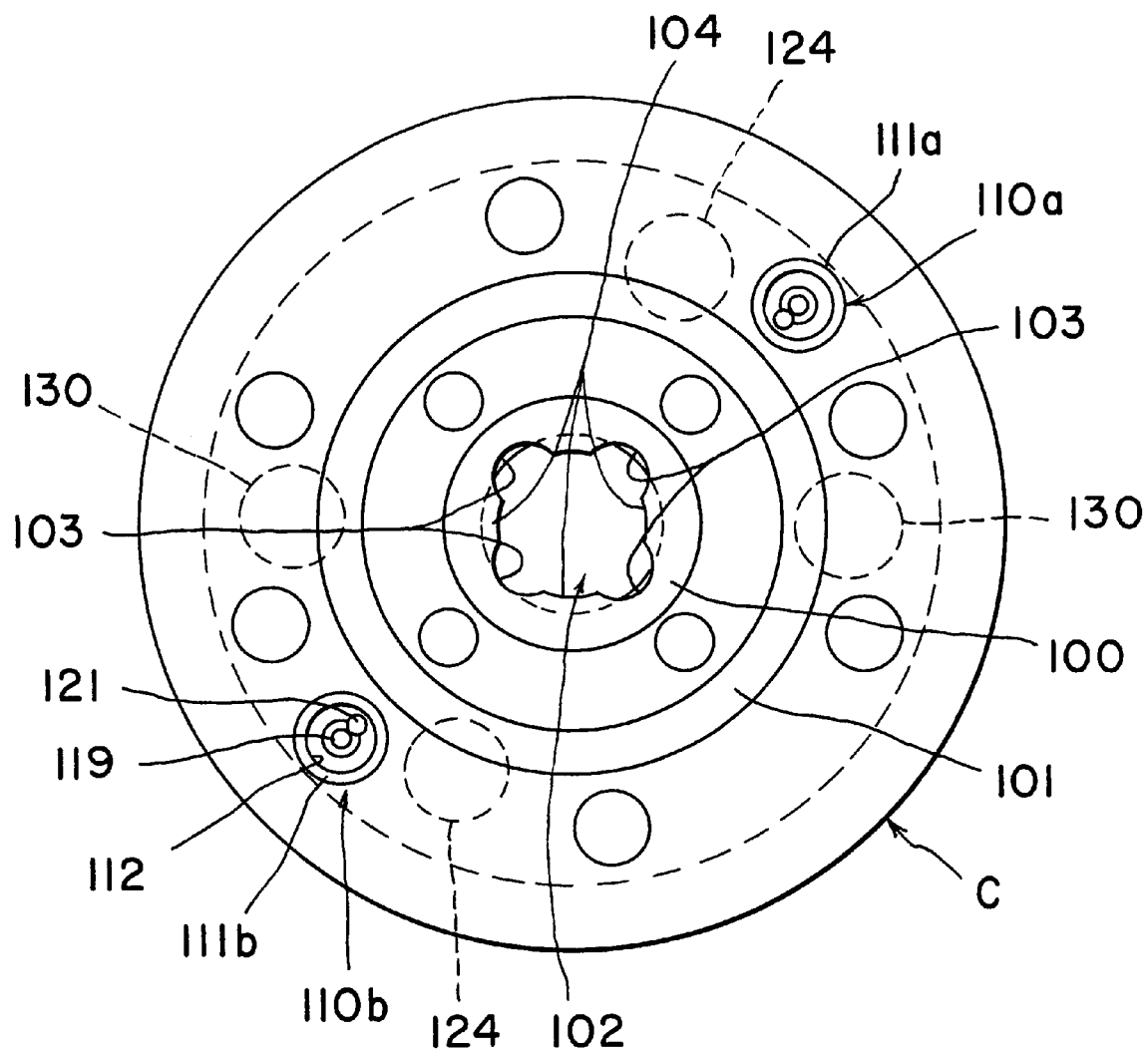
FIG. 6 is a back view of a chuck.

As shown in FIG. 6, the inlet small-diameter portion of the engaging portion 102 is formed at circumferential intervals with retractable-claw passing portions 103 for allowing, the retractable claws 40 to pass therethrough in axial directions. The engaging claws 104, which are engageable with the retractable claws 40 in axial directions, are formed between adjacent passing portions 103.

In FIG. 11, the chuck C is gripped by the opening/closing arm 8 of the chuck moving means 3 so that the retractable claws 40 at the unclamped angular position P1 face the retractable-claw passing portions 103 when the chuck C is coaxial with the main spindle 2 and the piston rod 50 of the clamp cylinder 43A of the workpiece mounting station 85. In the state of the chuck C shown in FIG. 1A, the workpiece W is not gripped by the chuck C. In order to grip the workpiece, the piston 105 of the jaw operating cylinder 90 moves rearwards from the position of FIG. 1A to move the gripping jaws 93 radially inwards.

The piston 105 is fitted into the cylinder chamber so as to be movable in axial directions. A piston rod 106 integral with the piston 105 projects forwards from the front wall of the cylinder body 96 to form the jaw operating cylinder 90. A wedge plunger 107 connected to the piston rod 106 engages a wedge portion 108 of the master jaw 92. On the reverse surface of the chuck C, supply/discharge connecting portions 110a and 110b (FIG. 6) are provided so as to face the fluid shut-off valves 20a and 20b of the mounting adapter 15 (15A) in axial directions when the chuck C is coaxial with the main spindle 2 and the piston rod 50 of the clamp cylinder 43A of the workpiece mounting station 85. Therefore, as shown in FIG. 6, the supply/discharge connecting portions 110a and 110b are positioned at an upper-right position of 45 degrees and a lower-left position of 45 degrees, respectively, viewed from the back of the chuck C. The supply/discharge connecting portions 110a and 110b are provided with fluid couplers 111a and 111b, respectively.

As shown in FIGS. 1A and 1B, in each of the fluid couplers 111a and 111b, a hollow sleeve 113 having a receiving hole 112 for receiving the tip of the cylindrical insertion member 22 of each of the shut-off valves 20a and 20b, is clamped between the annular fixing member 99 and the clamping member 98. On the front side of each of the hollow sleeves 113, a suction chamber 114 is provided. A suction piston 115 is fitted into the suction chamber 114 so as to be movable by a predetermined stroke, and a piston rod 116 integral with the suction piston 115 is movably fitted into in the receiving hole 112 of the hollow sleeve 113 so as to be liquid-tightly sealed by means of an O-ring.

The suction piston 115 is biased by means of a spring 117 backwards and prevented from slipping out by means of the hollow sleeve 113. A pushing shaft member 118 is clamped between the chuck body 91 and the clamping member 98. A pushing shaft 119 passing through the center of the suction piston 115 via the suction chamber 114 integrally projects from the pushing shaft member 118 toward the back surface. The tip of the suction piston 115 serves as a supply port 120 facing the supply port 21 of each of the shut-off valves 20a and 20b. The suction piston 115 is provided with a small-diameter communication passage 121 for establishing a fluid communication between the suction chamber 114 and the supply port 120. The pushing shaft member 118 is formed with a fluid passage 122 which is in communication with the suction chamber 114. The fluid passage 122 is also in communication with a fluid passage 123 formed in the chuck body 91. A check valve 124 is provided in the fluid passage 123.

In FIG. 6, the upper-right supply/discharge connecting portion 110a is in communication with the front cylinder chamber 95a of the jaw operating cylinder 90, and the lower-left supply/discharge connecting portion 110b is in communication with the rear cylinder 95b. When the chuck C is completely mounted on the mounting adapter 15 (15A), the valve element 26 of the shut-off valve 20a (20b) becomes open by being pushed with the pushing shaft 119, so that the fluid circuit on the side of the chuck C is communicated with the fluid circuit on the side of the mounting adapter 15 (15A). On the other hand, the cylindrical insertion member 22 of the shut-off valve 20a (20b) pushes the suction piston 115 by a predetermined stroke. When the chuck C is disengaged from the mounting adapter 15 (15A), the valve element 26 is closed while the cylindrical insertion member 22 is being withdrawn from the receiving hole 112. However, at this time, the suction piston 115 is being pushed by the cylindrical insertion member 22 of the shut-off valve 20a (20b) so as to leave a stroke by which the suction piston 115 can move in valve opening/closing directions. As will be described later, the diameter of the communication passage 121 is set so that the fluid flowing from the check valve 124 to the communication passage 121 is prevented from leaking after sucking the fluid, in view of the amount and viscosity of the fluid flowing from the check valve 124 to the communication passage 121.

Figure 7A:
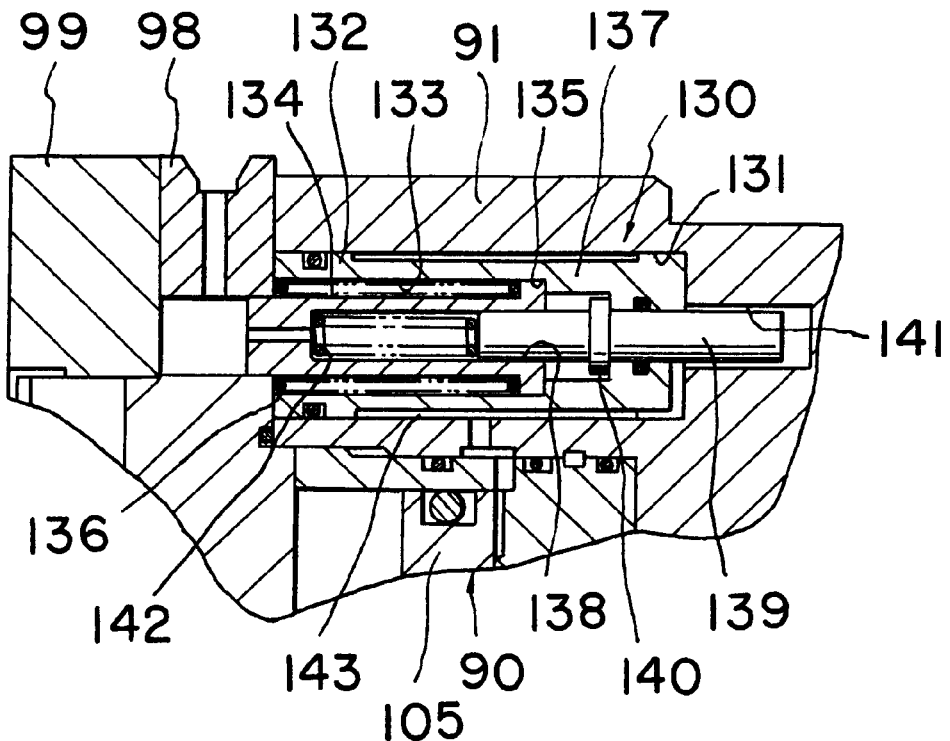
FIGS. 7A and 7B are sectional views of an accumulator in different states.

An accumulator 130 is connected to each of the front and rear cylinder chambers 95a and 95b of the jaw operating cylinder 90. As shown in FIG. 7A, the accumulator 130 has a receiving hole 131 formed in the chuck body 91 so as to extend in axial directions. The receiving hole 131 liquid-tightly receives therein a tube 132, the rear end of which is open. The tube 132 is in contact with the clamping member 98. A stepped large-diameter hole 133 is formed in the tube 132. A large-diameter first pressure hold piston 134 is movably received in the large-diameter hole 133. The first pressure hold piston 134 is biased forwards by means of a spring 136 which is provided between a front-end stop portion 135 and the clamping member 98. The movement of the first pressure hold piston 134 is restricted by a stepped portion 137 of the stepped hole. A small-diameter second pressure hold piston 139 is guided by a central hole 138 with a bottom, of the pressure hold piston 134 so as to be movable in axial directions. The pressure hold piston 139 is integrally formed at a longitudinally intermediate portion thereof with a contact flange 140, which is able to contact the large-diameter pressure hold piston 134. The tip of the pressure hold piston 139 projects from the tip of the tube 132 to an accumulator chamber 141. The pressure hold piston 139 is biased forwards by means of a spring 142 provided between the bottom of the central hole 138 and the pressure hold piston 139. The inside and outside springs 142, 136 are arranged so that the axial positions thereof overlap each other. The elastic force of the spring 136 of the pressure hold piston 134 is set to be greater than the force of the spring 142 of the pressure hold piston 139.

Figure 7B:
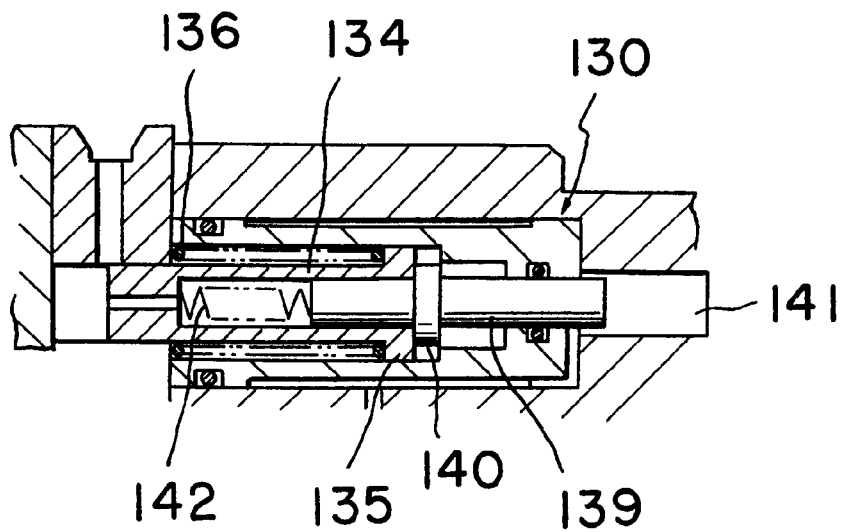

The fluid supplied to the front (rear) cylinder chamber 95a (95b) flows into the accumulator chamber 141 via a fluid passage 143 formed between the tube 132 and the receiving hole 131, so that the second pressure hold piston 139 is urged against the biasing force of the spring 142. Then, when the contact flange 140 contacts the stop portion 135, the first pressure hold piston 134 is urged against the biasing force of the spring 136 as shown in FIG. 7B, so that the fluid pressure is maintained by the forces of the springs. With this construction, since the axial positions of the two springs 136 and 142 are overlapped with each other, the longitudinal size of the accumulator 130 is reduced.

The changing arm 6 of the chuck moving means 3 moves forwards to the forward end by the action of the cylinder 10. In this state, the changing arm 6 turns by 180 degrees by means of the rotary motor 12, so that the positions of the upper and lower chucks are replaced. The timing of this (FIG. 11) will be described. It is assumed that fluid pressure supplied to the interior of the chuck C by means of the incorporated check valve 124 and the accumulator 130 is held in the chuck C so that the workpiece W is gripped by the jaw operating cylinder 90. The rotating clamp cylinder 41 arranged on the rear end of the main spindle 2 and the clamp cylinder 43A of the workpiece mounting station 85, together with the piston 49 and the piston rod 50, are positioned at the forward end position, so that the engaging portion 52 is disengaged from the engaging hole 54. The main spindle 2 and the retractable claws 40 of the retractable block 39 of the workpiece mounting station 85 are positioned at the unclamped angular position P2 shown in FIGS. 2 and 4B by the action of the lead groove 58. When the mounting adapter 15 is positioned as shown in FIG. 2 so that the shut-off valve 20a communicating with the front cylinder chamber 95a of the jaw operating cylinder 90 is positioned at an upper-left position and the shut-off valve 20b communicating with the rear cylinder chamber 95b of the jaw operating cylinder 90 is positioned at a lower-right position, the main spindle 2 is stopped, and the fluid shut-off valves 20a and 20b are closed.

Figure 8A:
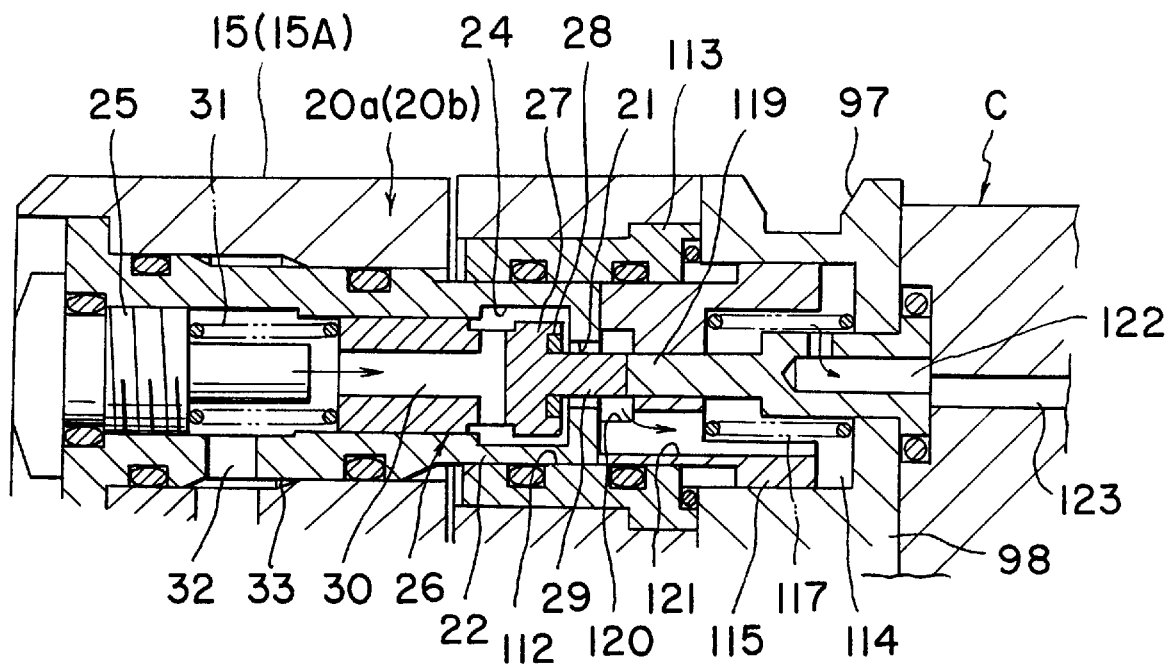
FIGS. 8A and 8B are view explaining the connection states of a fluid shut-off valve with a fluid coupler in different states.
Figure 9:
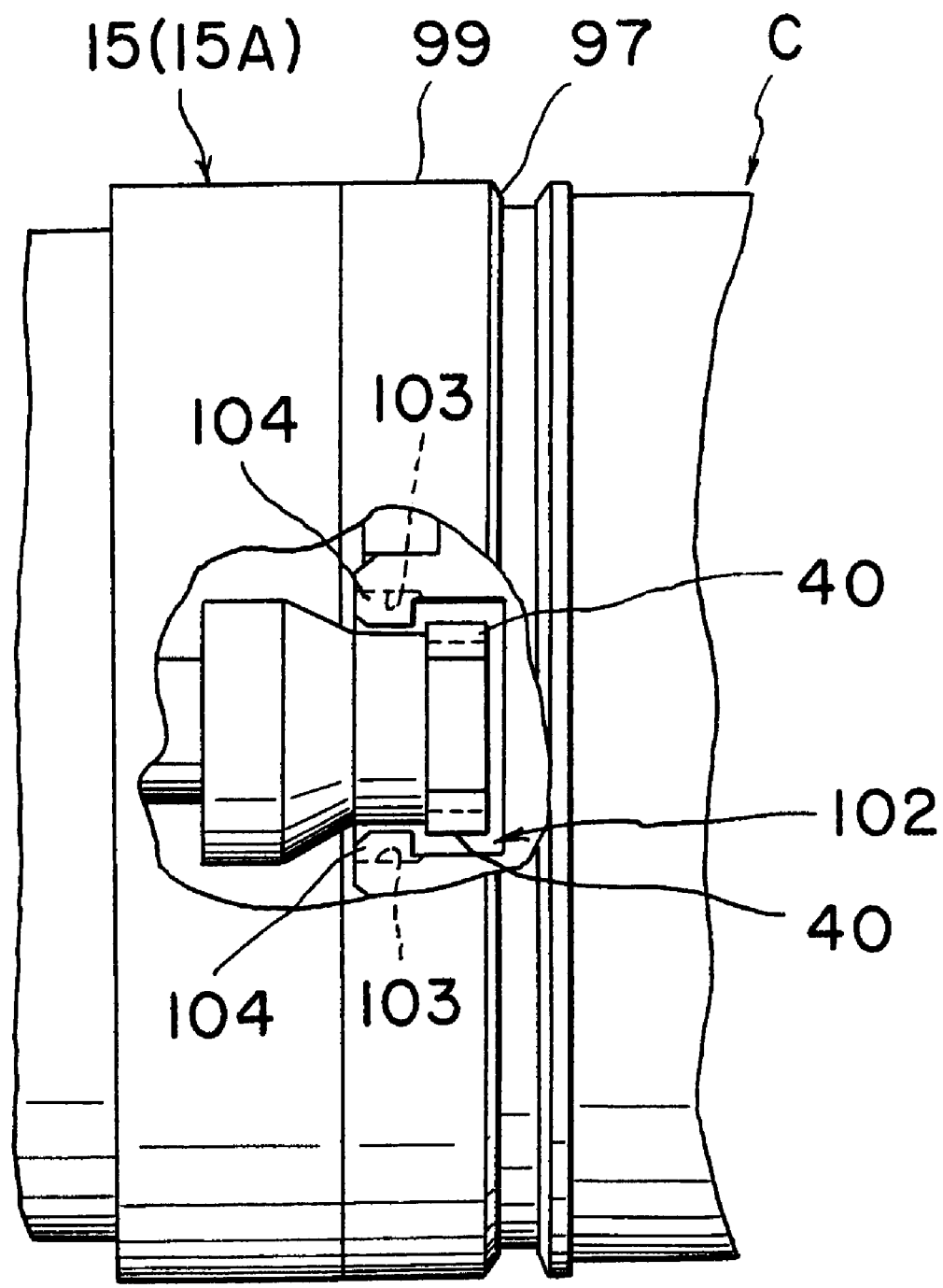
FIG. 9 is a view showing the relationship between retractable claws and engaging claws in a chuck unclamped state.

When the cylinder 10 is actuated to move the changing arm 6 backwards in the axial direction, the upper and lower chucks C move backwards in the axial direction of the main spindle 2 and in the axial direction of the clamp cylinder 43A, respectively, so that the respective couplings 101 behind the respective chucks C engage the corresponding couplings 17 of the mounting adapter 15 (15A). At this time, as shown in FIG. 9, the retractable claws 40 of the retractable block 39 positioned at the unclamped angular position P2 pass through the retractable-claw passing portion 103 arranged behind the chuck C, to enter the inside of the engaging portion 102, but are separated from the engaging claws 104 in circumferential and axial directions to be in the unclamped state. On the other hand, as shown in FIG. 8A, in the shut-off valves 20a and 20b, before the couplings 101 and 17 are completely engaged, the cylindrical insertion member 22 is fitted into the receiving hole 112 to allow the head thereof to push the suction piston 115, and the pushing shaft 119 opens the valve element 26. At this time, since no pressure fluid is supplied to the jaw operating cylinder 90, the jaw operating cylinder 90 remains gripping the workpiece W by the function of the check valve 124.

Then, when pressure fluid is supplied to the front cylinder chambers 47 of the clamp cylinders 43 and 43A, the piston 49 moves backwards from the forward end by the engagement of the guide groove 56 with the pin 57. On the other hand, since the rear end face 51a of the large-diameter portion 51 of the piston rod 50 contacts the front end face 54a of the engaging hole 54 to prevent the piston rod 50 from moving backwards in the axial direction, the piston 49 moves backwards in the axial direction with respect to the piston rod 50. At this time, the unclamped angular position P2 is turned to the clamped angular position P1 without moving the piston rod 50 backwards in the axial direction by the engagement of the lead groove 58 with the pin 59.

By this turning, at the timing when the retractable claws 40 reach the clamped angular position P1, the rear end face of the piston 49 contacts the front end face of the large-diameter portion 51 of the piston rod 50, and the two flat-surface portion of the engaging portion 52 corresponds to the two flat-surface portion of the engaging hole 53 (FIG. 4A). Moreover, when the piston 49 moves backwards, the piston rod 50, together with the piston 49, moves without rotating relatively, so that the engaging portion 52 engages the engaging hole 53. Thus, the retractable claws 40 move backwards in the axial direction while facing the engaging claws 104 of the engaging portion of the chuck C, and strongly draw the engaging claws 104, so that the chuck C is mounted on the main spindle 2 or the mounting adapter of the workpiece mounting station 85 (FIG. 10).

Thereafter, even if the supply of pressure fluid is inhibited outside of the supply/discharge port 73b in the clamp cylinder 43 at the rear end of the main spindle 2, the internal pressure of the pressure fluid in the front cylinder 47 of the clamp cylinder 43 at the rear end of the main spindle 2 is maintained by the check valve 76, so that the clamped state of the chuck C clamped by the main spindle 2 is maintained.

When the chuck C remains being mounted on the main spindle 2 or the like for a long time, such as in the case of holiday for a long term, fluid pressure in the clamp cylinders 43 and 43A may be reduced. However, since the piston rod 50 is always drawn by means of the spring 64 in the clamped direction, the chuck clamped state is maintained by the spring force. Therefore, it is possible to prevent the chuck C from being disengaged from the mounting adapter 15 (15A) or from dropping, so that it is possible to ensure the safety.

Thus, when the chuck C is mounted on the main spindle 2, pressure fluid is supplied from the supply/discharge port 74a of the rotating clamp cylinder 41 in order to cause the jaw operating cylinder 90 of the chuck C to grip the workpiece. Then, fluid is supplied to the front cylinder chamber 95a of the jaw operating cylinder 90 via the corresponding fluid passage 79, the supply/discharge pipe 83, the fluid passage 34 of the mounting adapter 15, the shut-off valve 20a, the communication passage 121, the suction chamber 114 and the check valve 124 of the rotating clamp cylinder 41, so that the gripping jaws 93 of the chuck C move in the gripping direction (radially inwards) to increase the gripping force applied to the workpiece W. At this time, the check valve 124 connected to the rear cylinder chamber 95b, to which the fluid is discharged, is open by the pilot pressure of the supplied fluid. Then, the opening/closing arm 8 of the chuck moving means 3 on the side of the main spindle 2 is open, and the main spindle 2 is rotated while the fluid is supplied from the fluid source 201 to the chuck C, so that the workpiece is machined. Thus, since it is possible to continue to supply the fluid to the jaw operating cylinder 90 in the chuck C during the machining, the workpiece gripping force can be reliably maintained for safety, in comparison with a case where the machining is performed by only maintaining the fluid pressure by means of the internal check valve 124.

On the other hand, to the chuck C fixed to the workpiece mounting station 85, pressure fluid is supplied from the supply/discharge port connected to the rear cylinder chamber 95b of the jaw operating cylinder 90. Thus, pressurized fluid is supplied to the rear cylinder chamber 95b of the jaw operating cylinder 90 via the shut-off valve 20b, the communication passage 121, the suction chamber 114 and the check valve 124, so that the wedge plunger 107 moves forwards to open the jaws 93 to release the workpiece W. Thereafter, the workpiece W is replaced by a new workpiece, and pressurized fluid is supplied to the front cylinder chamber 95a of the jaw operating cylinder 90 to move the plunger 107 backwards, so that the workpiece W is gripped. After gripping, the supply of the pressurized fluid is stopped by a check valve (not shown) in order to release the chuck C, and the fluid passage on the side of the fluid source from the two check valves 124 in the chuck C is communicated with the fluid reservoir so that the internal pressure is removed. However, since the supply pressure is maintained in the chuck C by means of the check valves 124 provided therein, the chuck C remains gripping the workpiece W. Even if fluid slightly leaks from the check valves 124, pressurized fluid is supplied supplementally from the accumulator 130, so that pressure is maintained for a long term and safety is ensured.

Thus, when the replacement of the workpiece on the chuck C of the workpiece mounting station 85 and the machining on the chuck C on the side of the main spindle 2 are completed, the main spindle 2 is rotated to the angular position shown in FIG. 2 again so that the directional control valve 200 is switched to the central position to stop the supply of fluid into the chuck C, and the fluid passage from the check valve 124 to the directional control valve 200 is communicated with the reservoir T to remove the internal pressure therein. In this state, the opening/closing arms 8 grip the gripped grooves 97, and then, the pistons 49 of the upper and lower clamp cylinders 43 and 43A move forwards from the clamped position (the state shown in FIGS. 3 and 5). Thus, when the respective retractable claws 40 move forwards while maintaining the clamped angular position P1 so that the engaging portion 52 is disengaged from the engaging hole 54, the piston rod 50 is positioned at the forward end, so that the retractable jaws 40 are disengaged from the engaging claws 104 to release the chuck C. At the forward end of the piston rod 50, when the piston 49 moves further forwards with respect to the piston rod 50, the piston rod 50 is rotated by means of the inclined lead groove 58, and the retractable claws 40 on the tip thereof are rotated from the clamped angular position P1 to the unclamped angular position P2.

Figure 8B:
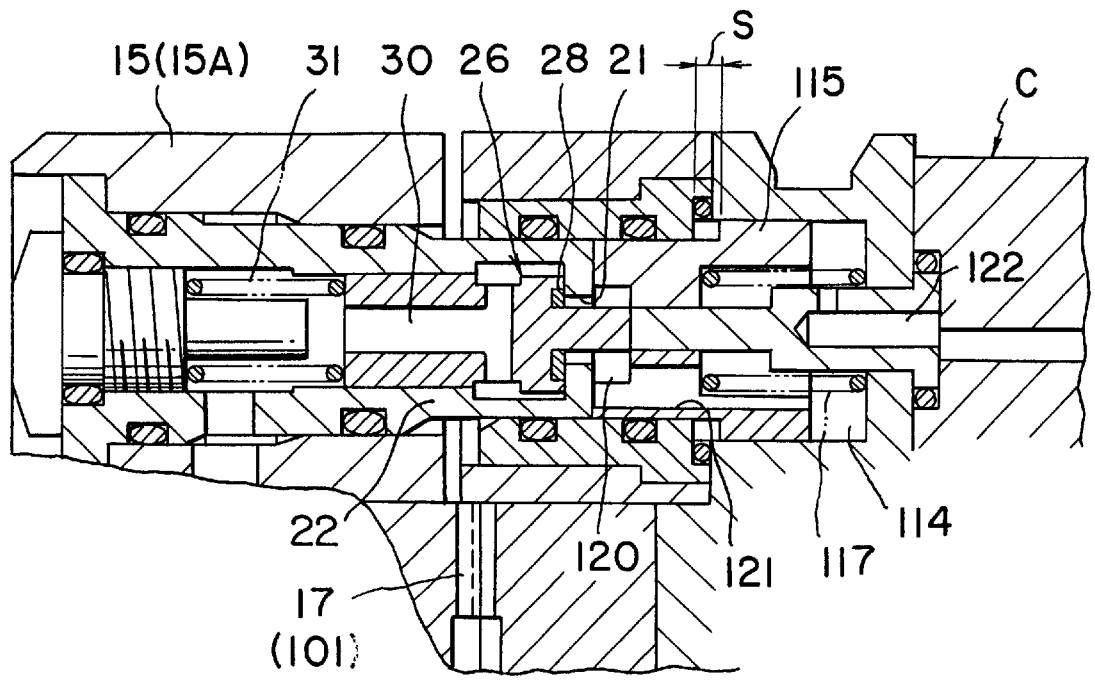

Then, when the body 4 moves forwards by the operation of the cylinder 10, the chuck C moves forwards, and the retractable claws 40 pass through the retractable-claw passing portion 103 on the side of the chuck C to be in the state shown in FIG. 1. Thus, while the chuck C is released from the mounting station 15 (15A), the valve elements 26 of the shut-off valves 20a and 20b are closed as shown in FIG. 8B. However, the suction piston 115 remains being pushed by the tip of the cylindrical insertion member 22 and having a stroke S in the valve opening/closing directions. When the valve elements 26 are closed, the lines extending from the supply ports 21 of the shut-off valves 20a and 20b to the check valve 124 via the supply ports 120 of the suction piston 115, the communication hole 121 and the suction chamber 114 are filled with a fluid (of course, the line extending from the check valve 124 to the jaw operating cylinder 90 is filled with a pressurized fluid).

When the chuck C moves forwards from this state, the suction piston 115 is moved by the biasing force of the spring 117 by the stroke S remaining in the opening/closing directions before the cylindrical insertion member 22 is drawn out of the receiving hole 112, so that a negative pressure is produced in the suction chamber 114. Thereafter, when the cylindrical insertion member 22 is released from the sealing portion of the receiving hole 112 to start the application of atmospheric pressure, fluid remaining in the supply ports 21 and 120 is sucked due to the negative pressure from the communication hole 121 toward the check valve 124, and the end face of the sucked fluid is approximately positioned within the communication hole 121 so as to be held by atmospheric pressure in the fluid passage, one end of which is closed by the check valve 124 in the chuck C. Therefore, even if the shut-off valve 20b is completely separated from the coupler 111b, little fluid remains in the supply ports 21 and 120 so that dripping does not occur. Therefore, even if the fluid circuit is connected or disconnected by mounting or detaching the chuck C, it is possible to greatly reduce the amount of fluid leaking at the connecting portion from the fluid circuit to the outside, so that it is possible to prevent environmental contamination and to reduce the amount of the working fluid lost in the fluid circuit. Furthermore, when the workpiece is released while the chuck C is clamped on the main spindle 2, the fluid may be supplied so as to operate the jaw operating cylinder 90 in the opposite manner to the aforementioned manner.

Figure 13:
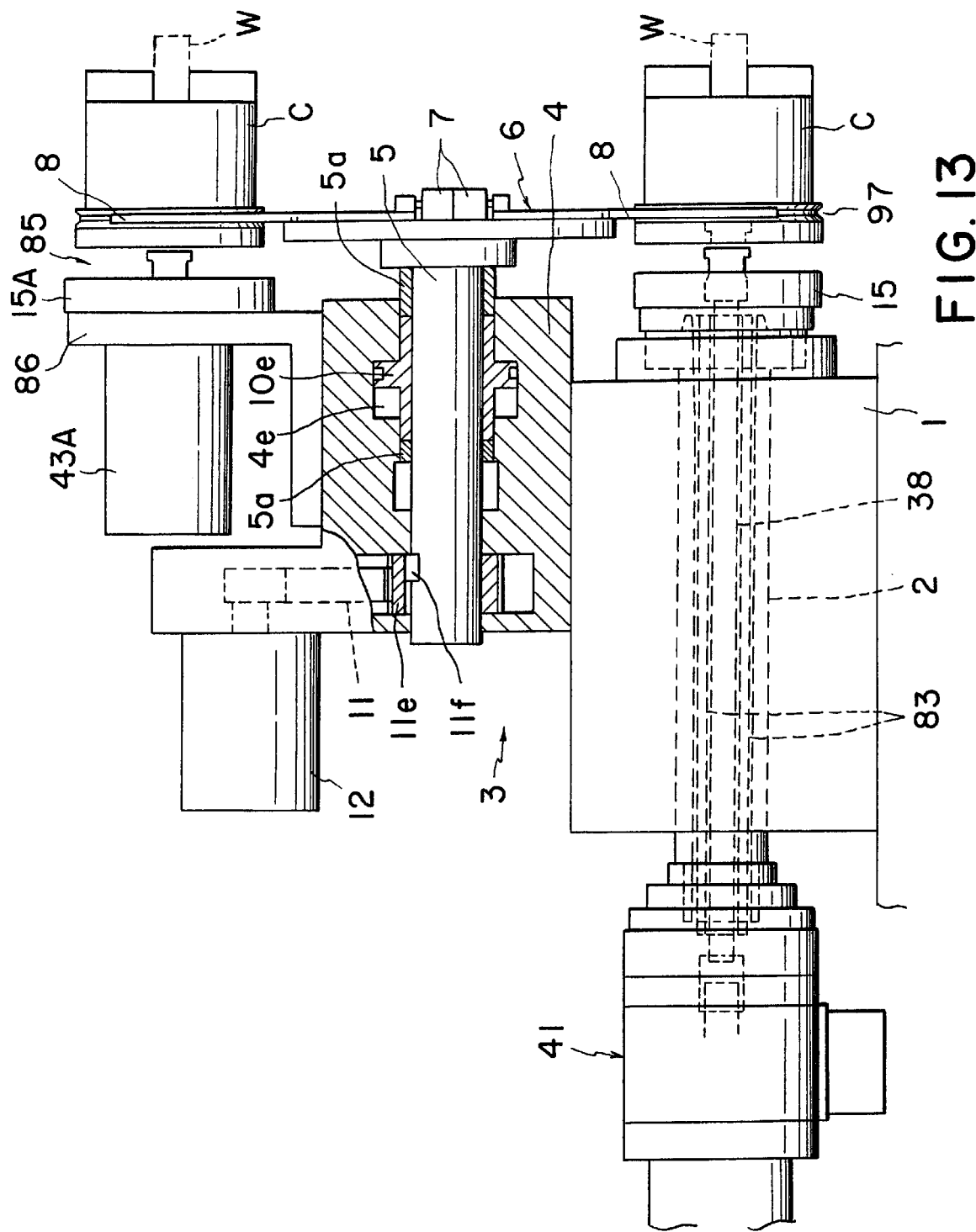
FIG. 13 is a partially-sectioned side view of another preferred embodiment of a chuck system according to the present invention.

FIG. 13 shows another preferred embodiment of the changeable chuck system according to the present invention. In this embodiment, the mechanism for driving the arm shaft 5 of the chuck moving means 3 is modified. The arm shaft 5 is pivotably supported on the body 4 fixed to the main-spindle head 1 so as to be movable in axial directions. A piston 10e is pivotably fitted into the arm shaft 5 while preventing relative movement of the piston 10e with respect to the arm shaft 5 in axial directions by means of a pair of fasteners 5a fixed to the arm shaft 5. The piston 10e is fitted into the piston chamber 4e provided in the body 4 so as to be movable forwards and backwards by a predetermined distance by a pressurized fluid (a pressure oil). A gear 11e of a train of gears 11 is fitted into the arm shaft 5 via a sliding key 11f so as to be rotatable and movable in axial directions with the arm shaft 5. The gear 11e is held by the body 4 so as not to move in axial directions. The arm shaft 5 is rotated in opposite directions every 180 degrees or in a direction by rotating the gear 11e by means of a rotary motor 12, so that the two chucks C are changeably mounted on the main spindle 2 or the workpiece mounting station 85.

As mentioned above, according to the present invention, when a chuck that can grip a workpiece by itself is mounted on a main spindle, a fluid supply/discharge portion prepared on the side of the main spindle is automatically connected to a supply/discharge connecting portion of the chuck. Therefore, a fluid circuit can be established between the chuck and the main spindle by only mounting the chuck on the main spindle, so that a working fluid is supplied from the chuck mounting portion to the chuck to operate the chuck operating cylinder, and the chuck jaws can be open and closed while the chuck is mounted on the main spindle.

In addition, a workpiece can be machined while pressurized fluid is supplied to the jaw operating cylinder, so that the workpiece can be more safely worked in comparison with a case where the workpiece is machined while being gripped by only the pressure hold by the check valve. In addition, since a plurality of springs of the accumulator are arranged so that the axial positions correspond to each other, it is possible to reduce the longitudinal size and it is possible to prevent the thickness of the chuck from increasing even if the accumulator is arranged so as to extend in axial directions of the chuck.

Moreover, since the liquid fluid remaining between the fluid connection ports of the chuck and chuck mounting portion to be easy to drop is sucked into the side of the chuck when the chuck is disengaged from the chuck mounting portion, it is possible to reduce the amount of the liquid fluid, and it is possible to reduce the amount of the fluid, which is lost from the fluid circuit due to the drop of the working fluid and which must be replaced for the fluid supply tank, so that it is economical. In addition, the self-hold type chuck can be changed by the jaw operating cylinder between the position of the main spindle and another position, and the jaws can be open and closed at the respective positions by the jaw operating cylinder. Therefore, during the machining at the position of the main spindle, a setup operation can be carried out at another position, so that the operation efficiency can be improved and the construction of the system can be simplified.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A changeable chuck system comprising a main spindle of a machine tool, and a changeable chuck detachably mounted on the main spindle: wherein said changeable chuck comprises:

gripping jaws for gripping a workpiece;

a jaw operating fluid cylinder for moving the gripping jaws between a workpiece gripping position and a workpiece releasing position;

fluid supply/discharge connecting means for supplying therethrough a pressurized fluid to the jaw operating fluid cylinder and for discharging therethrough the pressurized fluid from the jaw operating fluid cylinder;

a check valve provided between the jaw operating fluid cylinder and the fluid supply/discharge connecting means;

said changeable chuck being capable of gripping and releasing the workpiece by pressurized fluid supplied from a chuck mounting portion including the main spindle to the fluid supply/discharge connecting means when the changeable chuck is mounted on said chuck mounting portion including the main spindle; and said check valve being capable of preventing leakage of the pressurized fluid supplied to said jaw operating fluid cylinder out of said cylinder to maintain the workpiece in a gripped state, whereby said chuck is allowed to be detached from a chuck mounting portion to be mounted on another chuck mounting portion while the chuck is gripping the workpiece; and wherein said main spindle includes an adapter which has engaging means for detachably holding said chuck, and said adapter has fluid supply/discharge means adapted to be brought into communication with said fluid supply/discharge connecting means of the chuck when the chuck is mounted on the adapter, so as to allow said jaw operating fluid cylinder to operate said gripping jaws when the chuck is mounted on the main spindle.

2. The changeable chuck system according to claim 1, wherein said chuck mounting portion other than the main spindle has fluid supply/discharge means adapted to be brought into communication with said fluid supply/discharge connecting means of the chuck when the chuck is mounted on the chuck mounting portion.

3. The changeable chuck system according to claim 1, further comprising:
    an accumulator provided to communicate with each of cylinder chambers of said jaw operating fluid cylinder, said accumulator including:
    an accumulator chamber;
    a tube;
    a first pressure hold piston slidably fitted in said tube to be shiftable along said tube and having a central hole;
    a second pressure hold piston slidably fitted in said central hole of the first pressure hold piston, said second pressure hold piston being exposed to said accumulator chamber to be acted upon by accumulated pressure within said accumulator chamber;
    a first spring for urging said first pressure hold piston towards said accumulator chamber;
    a second spring for urging said second pressure hold piston towards said accumulator chamber, said first spring being stronger than said second spring; and
    said first and second springs being overlapped in an axial direction along said tube.

4. The changeable chuck system according to claim 3, wherein said second pressure hold piston has a contact flange adapted to abut against said first pressure hold piston when the second pressure hold piston is shifted by a distance in said axial direction against said second spring.

5. The changeable chuck system according to claim 1, wherein said fluid supply/discharge connecting means includes suction means for sucking fluid remaining therein toward said check valve while the chuck is being detached from said chuck mounting portion.

6. The changeable chuck system according to claim 5, wherein said chuck mounting portion is on said main spindle.

7. The changeable chuck system according to claim 5, wherein said suction means includes:
    a suction piston provided in said fluid supply/discharge connecting means of the changeable chuck and having a communication passage therethrough, said suction piston defining therebehind a suction chamber leading to said check valve;
    spring means urging the suction piston in a direction to expand said suction chamber and toward said fluid supply/discharge means of the chuck mounting portion on which the changeable chuck is mounted; and
    an insertion member provided on the fluid supply/discharge means of the chuck mounting portion, for abutting and pushing said suction piston against the force of said spring means so as to contract said suction chamber when said fluid supply/discharge means is brought into communication with said fluid supply/discharge connecting means;
    whereby when the fluid supply/discharge connecting means is brought out of communication with said supply/discharge means, said suction piston is brought out of abutment with said insertion member and moved by the spring means to expand said suction chamber so that a vacuum is instantly produced in the suction chamber to suck any remaining fluid toward said check valve through said communication passage.

8. The changeable chuck system according to claim 7, wherein said insertion member of the fluid supply/discharge means has a bore therein and a fluid supply port in a tip end thereof, wherein a valve element is slidably received in said bore, said valve element having a projecting stud of a reduced diameter passing through said fluid supply port with an annular clearance therearound, and wherein a spring is provided to urge said valve element toward said fluid supply port so as to close the port.

9. The changeable chuck system according to claim 8, wherein said valve element has thereon a sealing member for tight sealing contact with said tip end of the insertion member around said fluid supply port.

10. The changeable chuck system according to claim 8, wherein said valve element has a fluid passage therethrough.

11. The changeable chuck system according to claim 8, wherein said fluid supply/discharge connecting means of the chuck has therein a pushing shaft for abutting said projecting stud extending from the insertion member, to push said valve element against said spring acting on the valve element so as to open said fluid supply port, when the chuck is mounted on the chuck mounting portion.

12. The changeable chuck system according to claim 1, further comprising:
    chuck moving means provided between a chuck mounting portion and said adapter of the main spindle for reciprocally moving the changeable chuck between the chuck mounting portion and the adapter.

13. The changeable chuck system according to claim 12, wherein:
    said chuck moving means comprises an arm shaft extending in parallel to said main spindle and disposed between the chuck mounting portion and the main spindle, changing arms provided on said main spindle for gripping and releasing the changeable chuck, and means for moving said changing arms in directions along said main spindle.

14. A changeable chuck for a machine tool comprising:
    gripping jaws for gripping a workpiece;
    a jaw operating fluid cylinder for moving the gripping jaws between a workpiece gripping position and a workpiece releasing position;
    fluid supply/discharge connecting means for supplying therethrough a pressurized fluid to the jaw operating fluid cylinder and for discharging therethrough the pressurized fluid from the jaw operating fluid cylinder;
    a check valve provided between the jaw operating fluid cylinder and the fluid supply/discharge connecting means;
    said changeable chuck being capable of gripping and releasing the workpiece by pressurized fluid supplied from a chuck mounting portion including the main spindle to the fluid supply/discharge connecting means when the changeable chuck is mounted on said chuck mounting portion including the main spindle;
    said check valve being capable of preventing leakage of the pressurized fluid supplied to said jaw operating fluid cylinder out of said cylinder to maintain the workpiece in a gripped state, whereby said chuck is allowed to be detached from a chuck mounting portion to be mounted on another chuck mounting portion while the chuck is gripping the workpiece; and said fluid supply/discharge connecting means including suction means for sucking fluid remaining therein toward said check valve while the chuck is being detached from the chuck mounting portion.

15. The changeable chuck according to claim 14, wherein said suction means includes:

a suction piston provided in said fluid supply/discharge connecting means of the changeable chuck and having a communication passage therethrough, said suction piston defining therebehind a suction chamber leading to said check valve;

spring means urging the suction piston in an outward direction to expand said suction chamber, said suction piston being adapted to be thrusted in an inward direction against said spring means when the changeable chuck is mounted on a chuck mounting portion;

whereby when the changeable chuck is detached from the chuck mounting portion, the suction piston is moved in the outward direction by the spring means to expand said suction chamber so that a vacuum is instantly produced in the suction chamber to suck any remaining fluid toward said check valve through said communication passage.

\* \* \* \* \*